(12) United States Patent
Jensen et al.

(10) Patent No.: US 9,010,967 B2
(45) Date of Patent: Apr. 21, 2015

(54) LIGHT COLLECTOR WITH COMPLEMENTING ROTATIONALLY ASYMMETRIC CENTRAL AND PERIPHERAL LENSES

(75) Inventors: Thøger Jensen, Aalborg (DK); Jesper Gadegaard, Aalborg (DK); Dennis Jørgensen, Rønde (DK)

(73) Assignee: Martin Professional ApS, Aarhus, N. (DK)

( * ) Notice: Subject to any disclaimer, the term of this patent is extended or adjusted under 35 U.S.C. 154(b) by 443 days.

(21) Appl. No.: 13/518,183

(22) PCT Filed: Dec. 20, 2010

(86) PCT No.: PCT/DK2010/050351
§ 371 (c)(1),
(2), (4) Date: Sep. 10, 2012

(87) PCT Pub. No.: WO2011/076215
PCT Pub. Date: Jun. 30, 2011

(65) Prior Publication Data
US 2013/0003388 A1 Jan. 3, 2013

(30) Foreign Application Priority Data
Dec. 21, 2009 (DK) .................................. 2009 01362

(51) Int. Cl.
*F21V 13/04* (2006.01)
*F21V 5/04* (2006.01)
(Continued)

(52) U.S. Cl.
CPC .............. *F21V 5/04* (2013.01); *Y10T 29/49764* (2015.01); *F21S 10/007* (2013.01); *F21V 5/008* (2013.01);
(Continued)

(58) Field of Classification Search
CPC ...... F21V 7/0091; G02B 26/007; G02B 27/0055; G02B 19/0028
USPC .......................... 362/311.01, 296.01, 311.06
See application file for complete search history.

(56) References Cited

U.S. PATENT DOCUMENTS 7,190,003 B2 * 3/2007 Isoda .............................. 257/98
7,580,192 B1 * 8/2009 Chu et al. ...................... 359/641
(Continued)

FOREIGN PATENT DOCUMENTS

GB 456520 11/1936

OTHER PUBLICATIONS

International Search Report; International Application No. PCT/DK2010/050351; International Filing Date: Dec. 20, 2010; 5 pages.
(Continued)

*Primary Examiner* — Anabel Ton
(74) *Attorney, Agent, or Firm* — Blank Rome LLP

(57) ABSTRACT

The present invention relates to a light collector for collecting light emitted by a light source and converting the collected light into a light beam. The light collector comprises a central lens part aligned along an optical axis of the light source where the central lens comprises a central entrance surface and a central exit surface. The light collector also has a peripheral lens part surrounding at least of part of the central lens. The peripheral lens comprises a that said central lens and said peripheral lens is mutual adapted to convert said light emitted by said light source into a common light beam having a substantial circular and rotationally symmetric cross sectional light distribution, where said common light beam comprises said first light beam part and said second light beam part.

16 Claims, 18 Drawing Sheets

(51) Int. Cl.
  *F21V 5/00*     (2006.01)
  *F21V 7/00*     (2006.01)
  *G02B 26/00*    (2006.01)
  *G02B 27/09*    (2006.01)
  *G02B 19/00*    (2006.01)
  *F21S 10/00*    (2006.01)
  *F21W 131/406*  (2006.01)
  *F21Y 101/02*   (2006.01)

(52) U.S. Cl.
  CPC ........ *F21V 7/0091* (2013.01); *F21W 2131/406* (2013.02); *F21Y 2101/02* (2013.01); *G02B 26/007* (2013.01); *G02B 27/0905* (2013.01); *G02B 27/0955* (2013.10); *G02B 19/0066* (2013.01); *G02B 19/0028* (2013.01); *G02B 19/0061* (2013.01)

(56) References Cited

U.S. PATENT DOCUMENTS

| | | | | |
|---|---|---|---|---|
| 7,934,858 B2* | 5/2011 | Nakamura | ................ | 362/311.09 |
| 8,070,329 B1* | 12/2011 | Bechtel et al. | ................ | 362/331 |
| 8,231,248 B2* | 7/2012 | Fu et al. | ................... | 362/311.02 |
| 8,251,547 B2* | 8/2012 | Yamaguchi | ............... | 362/311.02 |
| 8,308,321 B2* | 11/2012 | Ku et al. | ................. | 362/311.02 |
| 8,419,226 B2* | 4/2013 | Fu et al. | ........................ | 362/299 |
| 2002/0181231 A1 | 12/2002 | Luk | | |
| 2006/0196944 A1 | 9/2006 | Maeda et al. | | |
| 2008/0225528 A1* | 9/2008 | Holder et al. | ................. | 362/308 |
| 2009/0225552 A1 | 9/2009 | Chen | | |
| 2012/0300469 A1* | 11/2012 | Jorgensen et al. | ............. | 362/327 |

OTHER PUBLICATIONS

Kanayama et al.; Ultra Small Projector With High Efficiency Illumination; Consumer Electronis 2006, Digest of Technical Papers; Jan. 2006; 2 pages.

First Office Action; Dated: Aug. 9, 2013; Chinese Applicatin No. 2010800599357; 5 pages.

English translation; First Office Action; Dated Aug. 9, 2013; Chinese Application No. 2010800599357; 3 pages.

Search Report; Dated: Aug. 1, 2013; Chinese Application No. 2010800599357; 2 pages.

English translation; Search Report; Dated: Aug. 1, 2013; Chinese Application No. 2010800599357; 2 pages.

* cited by examiner

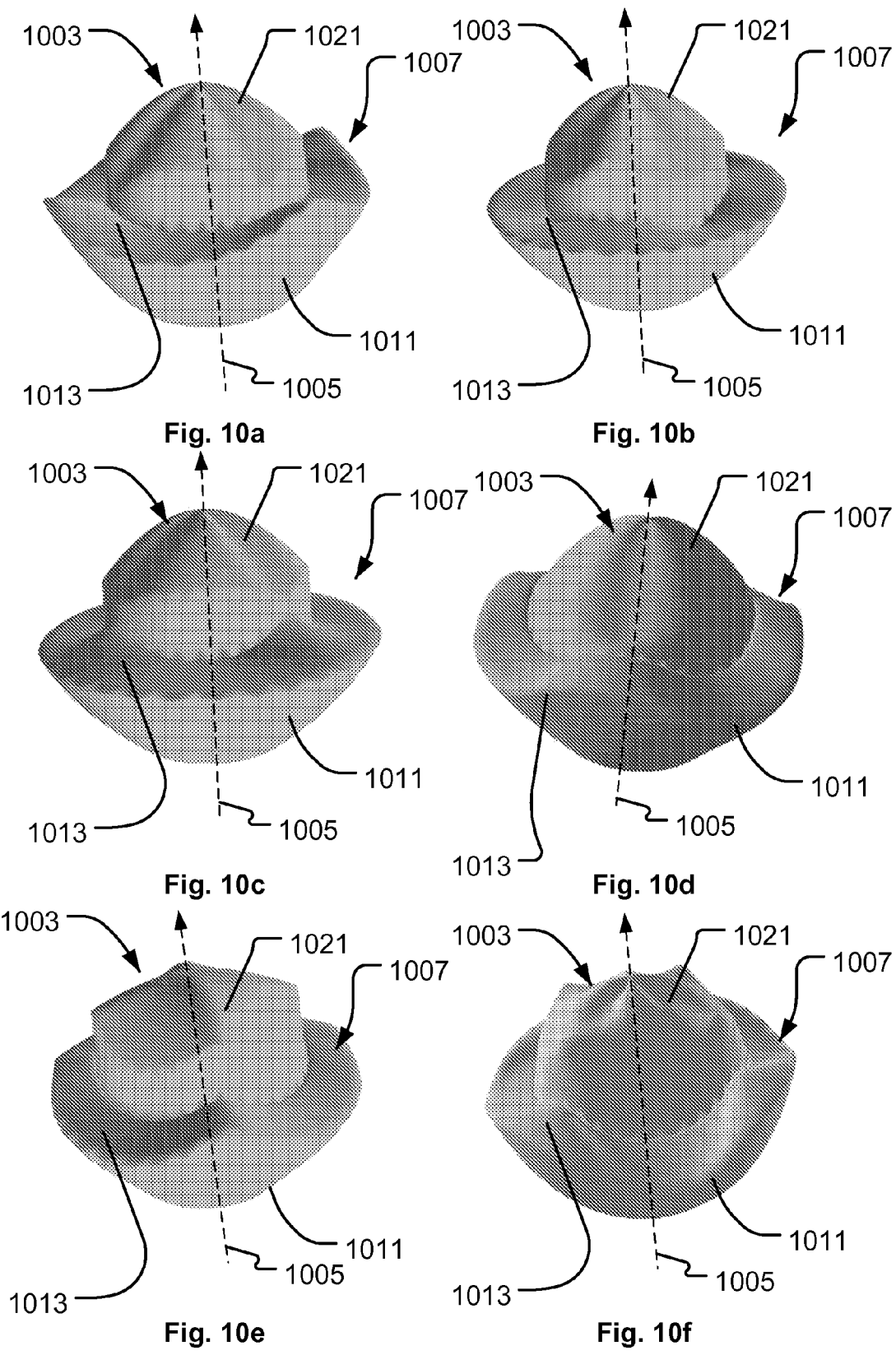

LIGHT COLLECTOR WITH COMPLEMENTING ROTATIONALLY ASYMMETRIC CENTRAL AND PERIPHERAL LENSES

FIELD OF THE INVENTION

The present invention relates to an illumination device illuminating an optical gate and projecting an image of the optical gate towards a target surface. The illumination device comprises a light source module generating light, an aperture delimiting the optical gate and a projecting system adapted to project the optical gate at a target surface.

The present invention also relates to a light collector for collecting light emitted by a light source and converting the collected light into a light beam. The light collector comprises a central lens part aligned along an optical axis of the light source where the central lens comprises a central entrance surface and a central exit surface. The light collector also has a peripheral lens part surrounding at least part of the central lens. The peripheral lens comprises a peripheral entrance surface, a peripheral reflection surface and a peripheral exit surface.

BACKGROUND OF THE INVENTION

Light emitting diodes (LED) are, due to their relatively low energy consumption, long lifetime, and capability of electronic dimming, becoming more and more used in connection with lighting applications. LEDs are successfully used in lighting applications for general illumination such as, wash/flood lights illuminating a wide area or for generating wide light beams e.g. for the entertainment industry.

However, LEDs have not presently been successfully used in connection with light application systems where an image is created and projected towards a target surface. This is especially the case in connection with entertainment lightning, where a high demand for lumen output and high image quality are required. LED projecting systems have not yet been able to fulfill these requirements.

The light in projecting systems is generally collected into an optical gate where the image is generated, and an imaging optical system projects the gate onto a target surface. WO0198706, U.S. Pat. No. 6,227,669 and U.S. Pat. No. 6,402,347 disclose lighting systems comprising a number of LEDs arranged in a plane array where a converging lens is positioned in front of the LED in order to focus the light, for instance to illuminate a predetermined area/gate or for coupling the light from the diodes into an optical fiber.

U.S. Pat. No. 5,309,277, U.S. Pat. No. 6,227,669, WO0198706, JP2006269182 A2, EP1710493 A2, U.S. Pat. No. 6,443,594 disclose lighting systems where the light from a number of LEDs is directed towards a common focal point or focusing area, for instance by tilting the LEDs in relation to the optical axis (JP2006269182 A2, WO0198706, U.S. Pat. No. 5,309,277) or by using individually refracting means positioned in front of each LED (U.S. Pat. No. 6,443,594, U.S. Pat. No. 7,226,185B, EP1710493).

WO06023180 discloses a projecting system comprising a LED array with a multiple number of LEDs where the light from the LEDs is directed towards a target area. The LEDs may be mounted to a surface of a curved base as illustrated in FIG. 1a or to a surface of a plane base as illustrated in FIG. 1b.

US 2008/0304536 discloses a high intensity lighting apparatus including an outer housing; a curved support disk having an array of diode or laser-based integrated light sources attached thereto disposed within the housing. Each of the light sources include a tube having a laser or diode chip at one end of the tube. The tubes each have at least one concave shaped exit surface on an end opposite the chip, wherein the concave exit surface converges light emitted from each of the light sources to focal points within the housing. A shape of the curved support disk converges the respective focal points into a light beam having a common focal plane. Adjustable secondary optics are disposed in the housing after the focal plane for creating various angles of transmission of the light beam. The laser can be a diode laser, while the diode can be a light-emitting diode (LED). The LED is encapsulated into the tube, where in one embodiment a tube has reflecting surfaces and a hybrid exiting surface. The hybrid exiting surface includes an inner spherical focusing element and outer parabolic focusing elements. Both the spherical 216 and parabolic focusing element 217 and 218 are configured to focus emitted light to the same focal point. The LED is encapsulated into the tube which optically reduces the efficient light emitting area of the LED and it is as a consequence difficult to maintain etendue through the entire optical system. Further it is difficult to design the focusing properties of the tube as focusing is performed by the hybrid exiting surface which constraints the designing options as only two surfaces parts can be adjusted. Yet another issue is the fact the high power LED used today often need cooling which is difficult provide when the LED is encapsulated into the tube.

US 2009/022552 discloses a light source-modulating device having composite curved surfaces comprises a light-distributing composite refractive surface, a base surface, a reflective surface and a light-modulating composite refractive surface, wherein the light-distributing composite refractive surface has a first and a second refractive surface, and the light-modulating composite refractive surface has a third and a fourth refractive surface. The light source-modulating device is particularly shaped so that light rays emitted from a light source and forming with a normal direction thereof an angle smaller than a light-distributing reference angle passes from the first refractive surface through the third refractive surface, which modulates an outgoing angle of said light rays; and light rays emitted from the light source and forming with the normal direction thereof an angle larger than the light-distributing reference angle passes from the second refractive surface to the reflective surface and is thereby reflected through the fourth refractive surface, which modulates an outgoing angle of said light rays. Thus, outgoing light rays emitted from the light source-modulating device are collimated and uniform.

U.S. Pat. No. 7,798,677 disclose an illumination unit for emitting light along an optic axis for a projection system includes an LED die and a collimator lens. The collimator lens includes a central part and a peripheral part. The central part has a first light transmission surface and a second light transmission surface opposite to the first light transmission surface. The peripheral part which is around the central part has an inner refraction wall coupled to the first light transmission surface to form a hollow for situating the LED die, an outer reflection wall opposite to the inner refraction wall, and a refraction surface connecting to the second light transmission surface and the outer reflection wall. The central part and the peripheral part of the collimator lens are oval and rotationally asymmetrical corresponding to the optic axis and both adapted to provide an elliptical light beam.

The prior art fixtures try to increase the lumen output by adding as many light sources as possible. The consequence is, however, that the efficiency with regard to power consumption versus light output is very low. Furthermore, a large amount of light is lost as the prior art fixtures typically only couple a central part of the light of the light beams through the gate in order to provide a uniform illumination of the gate, which again reduces the efficiency. The space in light fixtures is often limited and it is difficult to fit many light sources into prior art fixtures, for instance because the optical components associated with the light sources often take up a lot of space. Yet another aspect is the fact that color artifacts often appear in the output from fixtures having light sources of different colors. The reason for this is the fact that high performance LEDs used for stage-illumination have large, rectangular die areas of 5-12 mm2 and even higher This implies, that it is not possible to model the primary optics to a point source since the size-ratio between the primary optics and the LED die can get rather small. Furthermore, the rectangular shape can also be imaged in the output as rectangular patches. Compared to discharge lamps, these patches are ill fitted to smoothly fill out the circular spot profiles of stage-illumination instruments.

DESCRIPTION OF THE INVENTION

The objective of the present invention is to solve or minimize at least some of the above described problems. This can be achieved by the invention as defined by the independent claims. The benefits and advantages of the present invention are disclosed in the detailed description of the drawings illustrating the invention. The dependent claims define different embodiments of the invention.

DESCRIPTION OF THE DRAWING

FIG. 10a-10f illustrate other light collectors according to the present invention;

FIG. 11a-11j illustrate different aspects and results of a method for optimizing a NRS lens;

DETAILED DESCRIPTION OF THE INVENTION

Figure 1A:
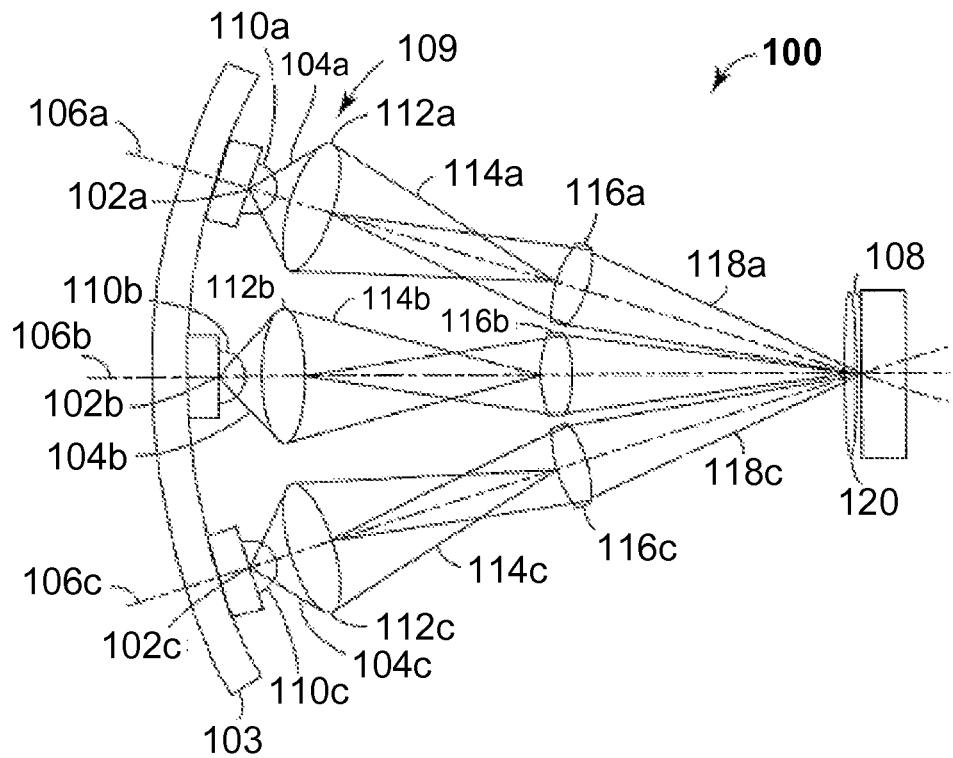
FIGS. 1a and 1b illustrate a prior art illumination system comprising a number of LEDs.

FIG. 1a illustrates an example of a prior art projecting system using multiple numbers of LEDs and shows a projecting system disclosed by WO06023180. The projecting system 100 comprises light generating elements (LEDs) 102a, 102b and 102c arranged to emit light 104a, 104b, 104c along axes 106a, 106b and 106c respectively towards a target area 108 and directed so as to intersect at the center of the target area 108. The target area 108 corresponds to the location of an image generating object.

Light collection units 109 including one or more lenses are used to collect the light 104a, 104b, 104c from each light generating element 102a, 102b and 102c. The light generating elements 102a, 102b and 102c have an associated lens 110a, 110b and 110c. For example, where the light generating elements 102a, 102b and 102c are LEDs, the associated lenses 110a, 110b and 110c are hemispherical lenses formed of a material encapsulating the LEDs. The light collection units 109 include condenser lenses 112a, 112b and 112c. The light generating element 102a has an associated lens 110a and a condenser lens 112a to collect the emitted light 104a. The collected light 114a is generally directed along the axis 106a towards an imaging lens unit 116a. The imaging lens unit 116a is positioned between the target area 108 and the condenser lens 112a so as to relay an image of the condenser lens 112a to a position in proximity to the target area 108. An image of the light generating element 102a may also be formed at the imaging lens unit 116a by the light collection optics 109 and any other lenses associated with the light generating element 102a.

The other light generating elements 102b and 102c each have respective light collecting lenses 110b,112b and 110c, 112c that direct the emitted light 104b and 104c towards the respective imaging lens units 116b and 116c. The imaging lens units 116b and 116c relay images of the output from the light collection optics—in other words images of the condenser lenses 112b and 112c to the target area 108. The images of the condenser lenses 112a, 112b and 112c overlap at the target area 108 and substantially fill, or may even slightly overfill, the target area 108.

The relayed light 118a and 118c generally propagates along the axes 106a and 106c, respectively. The axes 106a and 106c are tilted around the axis of the target area 108, the axis of the target area is coincident with the axis 106b, but in other examples it may be different. Tilting of the axes 106a and 106c permits the relayed light 118a and 118c to fill the angular space available at the target area 108. The light collection optics 112 of each channel are co-axial with the respective imaging lens unit 116 of that channel, with the result that the light propagates in each illumination channel along a single axis 106 from the light generating element 102 to the target 108. The axes 106a, 106b, 106c may be positioned to pass through the center of the target 108 and be oriented radially so as to accommodate the tangential dimensions of the optical elements associated with each illumination channel. This arrangement increases the intensity of the illumination light received at the target 108. Accordingly, the light generating element 102a, 102b 102c may be mounted to a surface of the curved base 103 that is spherical, with a radius of curvature centered approximately at the center of the target 108.

A field lens 120 may be positioned between the target 108 and the imaging lens units 16 so that the relayed light 118a and 118c stays within the acceptance cone of a imaging system imaging the target area. However, WO06023180 discloses that the light generating elements also may be mounted individually tangentially to an imaginary surface shown as 103.

Figure 1B:
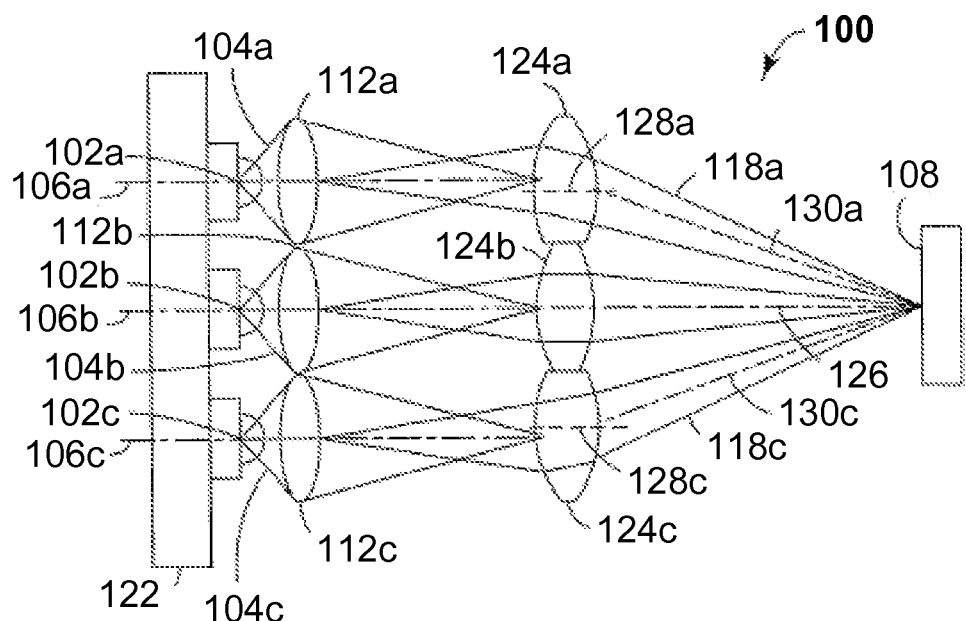

FIG. 1b discloses another embodiment of the illumination system disclosed by WO06023180. The light generating elements 102a, 102b 102c may be mounted on a planar base 122. The light generating elements 102a, 102b, 102c generally emit light 104a, 104b, 104c along their respective emission axes 106a, 106b, 106c. The emission axes 106a, 106b, 106c are parallel and the light 104a, 104b, 104c, in each illumination channel, is collected by respective light collection units 112a, 112b and 112c. The collected light is directed towards respective imaging lens units 124a, 124b and 124c, shown as single lenses. The light generating elements 102a, 102b, 102c may be imaged in proximity to the imaging lens units 124a, 124b and 124c. The imaging lens units 124a, 124b and 124c relay respective images of the closest lens of the light collection unit 112a, 112b, 112c to a position in proximity to the target area 108.

The imaging lens units 124a and 124c that lie off the target axis 126 are axially offset, that is the optical axes 128a, 128c of the imaging lens units 124a, 124c are offset from the axes 106a, 106c of the incident light 104a, 104c. Consequently, after passing through the imaging lens units 124a, 124c, the relayed light 118a, 118c generally propagates along axes 130a, 130c that are not parallel to the target axis 126.

The light collector according to the present invention is illustrated in FIGS. 8 to 10 and described in view of an illumination system in FIGS. 2 to 7 and FIGS. 11 to 12. The person skilled in the art of optics will realize that some of the shown light rays illustrate the principles behind the present invention rather than illustrating exact precise light rays. FIGS. 2a and 2b illustrate a cross section view of an illumination device 200 according to the present invention. FIG. 2a illustrates the general setup of the illumination device, whereas FIG. 2b illustrates other details of the setup. The illumination device comprises a light source module 201, an aperture 203 and a projecting system 205. The light source module generates a light beam (illustrated by thick dashed lines 207) propagating along a primary optical axis 209 towards the aperture 203. The aperture 203 is positioned upstream of the optical axis, with respect to the light source module. The projecting system 205 collects the light which has passed the aperture 203 and projects an image of the aperture 203 onto a target surface (not shown) a given distance from the projecting system. It is thus possible to position an image generating object (not shown) at the aperture 203, whereby the generated image will be projected to the target surface. This aperture is thus defining an object plane and is limiting the object diameter. The image generating object can for instance be a GOBO, a LCD, DMD, LCOS, or any object capable of manipulating the light beam.

The light source module comprises a number of light sources 211a-211c and a number of light collecting means 213a-213c. The light collecting means collect light from the light sources and generate a source light beam (not illustrated in FIG. 2a for simplicity). The source light beam propagates along a source optical axis 215a-215c, and the source optical axes meet in a common volume 217 along the primary optical axis. The common volume is a volume near the primary optical axis where at least one source optical axis intersects a plane through the primary optical axis, and where at least one source optical axis intersects a plane through at least another source axis. The source optical axes can in one embodiment intersect in a common focal point at the primary optical axis but do not, in other embodiments, necessarily intersect in a common focal point and can thus intersect in the common focal volume.

The projecting system 205 has an acceptance angle relative to the primary optical axis. The acceptance angle relative to the primary optical axis defines the maximum angle that a light beam can have in relation to the primary optical axis in order to be projected by the projecting system. Light beams having a larger angle relative to the primary axis will be lost in the optical system. The acceptance angle of a spherical symmetrical projecting system is given as:

$$\frac{\alpha}{2} = \arctan\left(\frac{D/2}{f}\right)$$

where α is the acceptance angle of the projecting system and f is the resulting focal length of the projecting system 205. D is the diameter of the entrance pupil of the projecting system, where the diameter of the entrance pupil is defined as the limiting diameter of the projecting system as seen from the object plane 203 through the front of the first lens. The limiting diameter of the projecting system is defined by the resulting acceptance area of the projecting system. The projecting system is illustrated as a single lens, but the person skilled in the art would understand that the projecting system can comprise any number of lenses and other optical elements, and even be a zoom system with variable focal length. The resulting focal length and resulting acceptance area of the projecting system is thus defined by the optical elements of the projecting system and the skilled person would be able to determine these based on her/his ordinary skills.

Figure 2A:
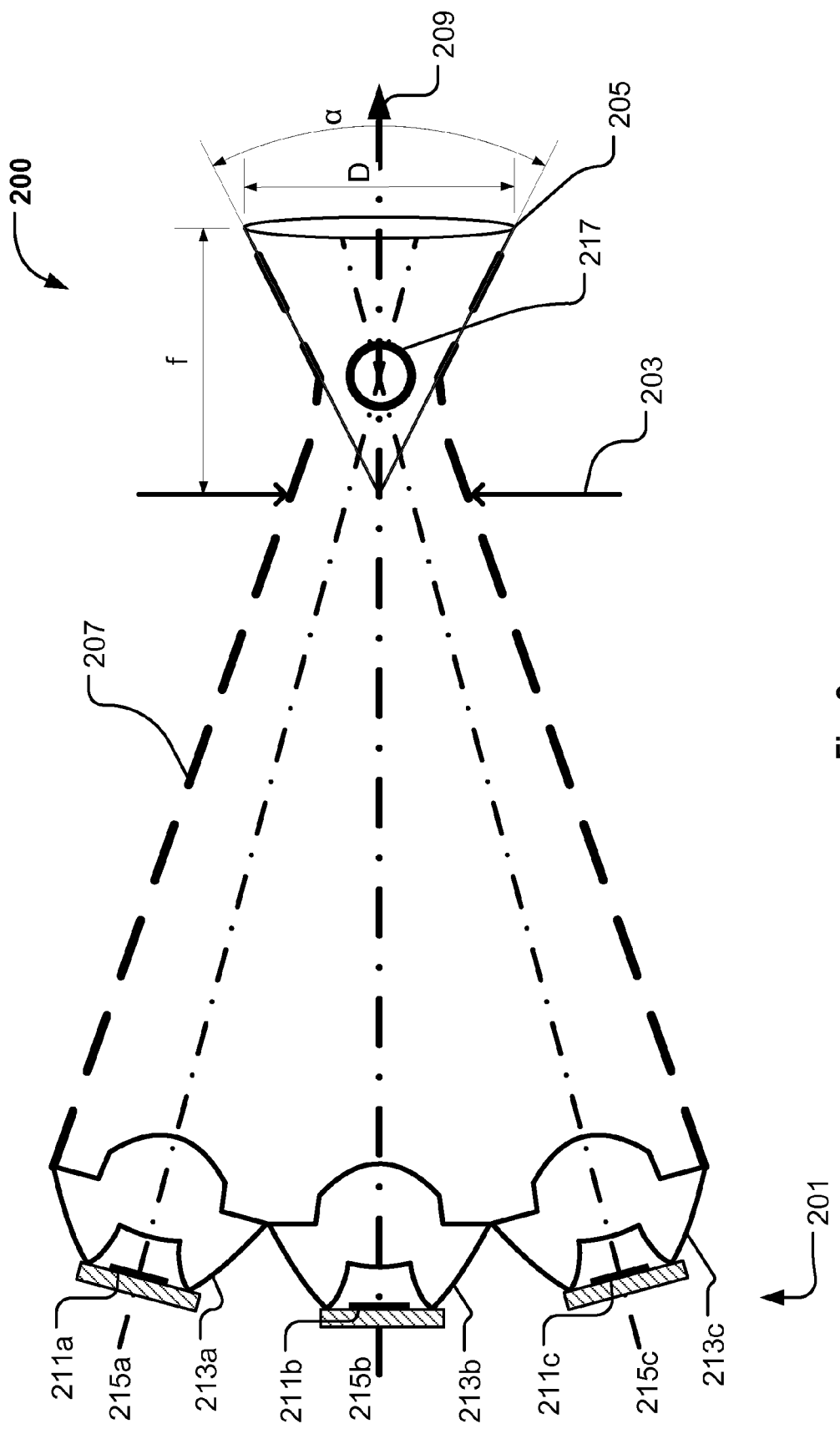
FIGS. 2a and 2b illustrate an illumination device according to the present invention.
Figure 2B:
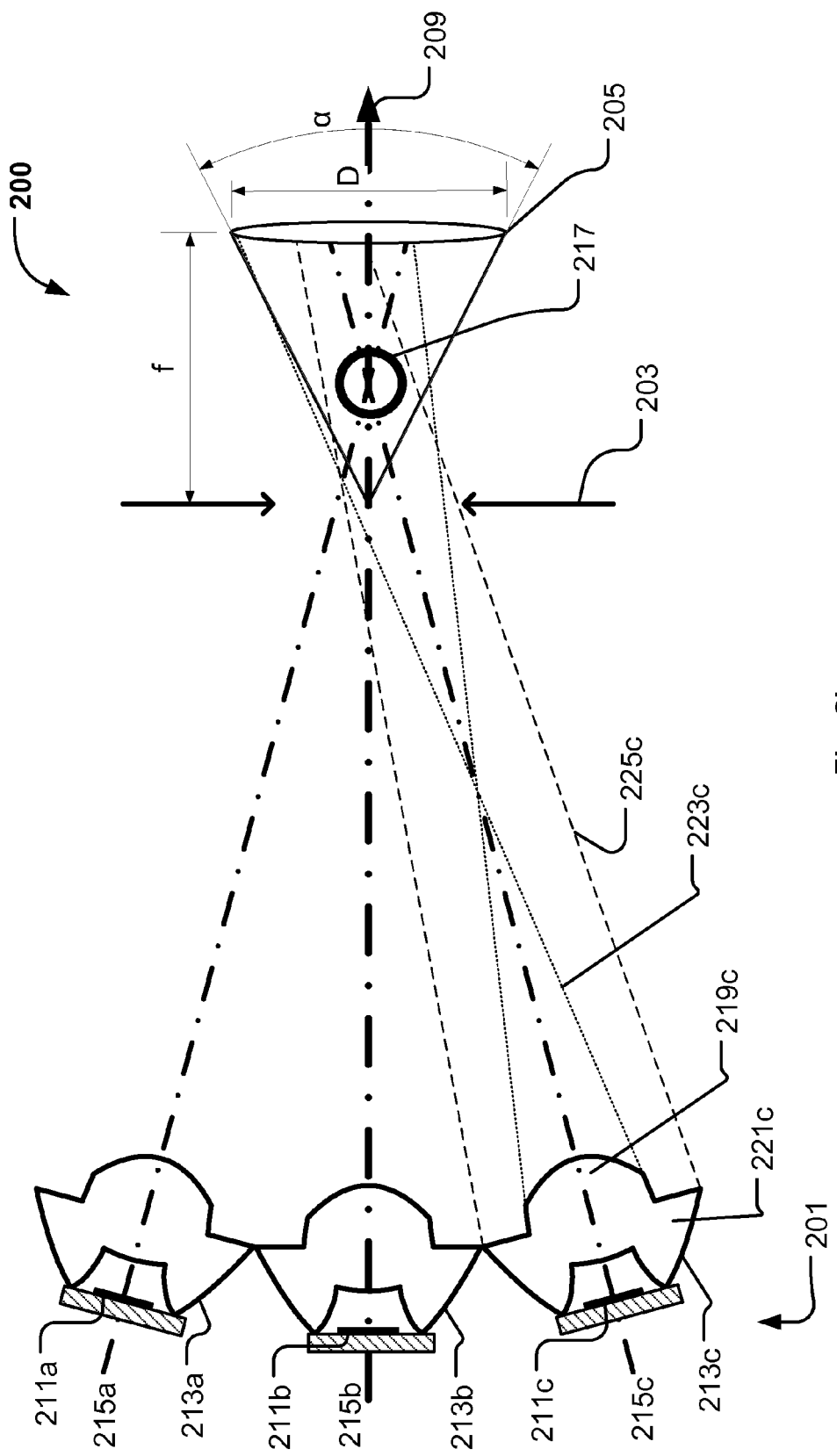

FIG. 2b illustrates the source light beam generated by light sources and light collection means and is for the simplicity of the drawing in FIG. 2b illustrated in connection with light source 211c and light collection means 213c. The skilled person will understand that a similar description applies to the other light sources 211a and 211b and light collection means 213a and 213b and will be able to apply this teaching to these light sources. Further, another number of light sources can be used in other setups. Light collecting means 213c comprise a central lens 219c aligned along the source optical axis 215c, and a peripheral lens 221c at least partially surrounding the central lens. The central lens 219c collects a first part of the light generated by the light source 211c and generates a first source light beam part 223c (illustrated by dotted lines). The peripheral lens collects a second part of the light generated by the light source 211c and generates a second source light beam part 225c (illustrated by dashed lines).

The central lens is further adapted to image the light source 211c at a position approximately between the aperture and the entrance pupil of the projecting optics. That the image of the light source can thus be created in a position starting for a small distance in front of the aperture and ending at a small distance after the entrance pupil of the projecting system. The small distance in front of the aperture does not exceed the cross section of the aperture and the small distance after the entrance pupil does not exceed the cross section of the entrance pupil. It is hereby possible to optimize to optical system to provide a uniform illumination of the aperture and at the same time collect much of the light by the projecting system.

The image of the light source can in one embodiment be positioned proximately to the aperture whereby the sharp contrast of the contours of the light source is created at the aperture plane. The position proximately to the aperture does not exceed distance in front of the aperture larger than the cross section of the aperture and a distance after the aperture larger than the diameter of the aperture. This is advantageous when the light source has a homogeneous light distribution across its cross section and/or when the shape of the light source is substantially identical to the shape of the aperture (e.g. both circular). The light source is in one embodiment a LED die and the central lens is designed so that the image of the LED die is placed at the proximately to aperture and is large enough for the aperture to be inscribed by the image of the source. The image can in other embodiments be moved away from the aperture whereby a defocused image of the light source is created at the aperture. This is advantageous in situations where the shape of the light source is not identical to the aperture as it is possible to make a defocused image where the contours of the light source is defocused in order to make a closer match between the shape of the light source and the aperture (e.g. rectangular light sources and circular apertures or the opposite).

The image of the light source can in one embodiment be positioned proximately to the entrance pupil of the projecting system, whereby almost most of the light created by the central part of the light source is collected by the projecting system. It is further achieved that the projecting system can not image the image of the light sources at the target surface. The position proximately to the entrance pupil does not exceed distance in front of the entrance pupil larger than the cross section of the aperture and a distance after the entrance pupil larger than the diameter of the aperture. The central lens can also be adapted to distort the image of the light source. The distortion can any optical aberration or distortion known in the art, for instance a barrel distortion where magnification decreases with the distance from the optical axis, pincushion distortion where magnification increases with the distance from the optical axis, spherical distortions, spherical aberrations etc. Further, the central lens can be adapted to provide aspherical focusing or distortion of the image in proximity to the aperture plane. An image of the light source is thus created near the aperture and the contour of the light source is thus at least visible at the aperture. Further, the central lens can be no-rotational symmetrically in order to compensate for a square or rectangular die, and in this way achieve the best compromise between light distribution in the aperture and optical efficiency.

The peripheral lens part 221c is further adapted to concentrate the second light beam part approximately between the aperture and the entrance pupil of the projecting optics. The peripheral lens will thus collect the outermost light beams from the light source and redirect these towards the aperture such that substantially all light collected by the peripheral light beam lies within and passes the aperture within the acceptance angle of the projecting optics. The second light beam part can in one embodiment be concentrated proximately to the aperture while the image of the light source is positioned proximately at the entrance pupil, whereby most of the peripheral part of the light can be used to illuminate the aperture and image of the light source if further avoided at the target surface.

Figure 3A:
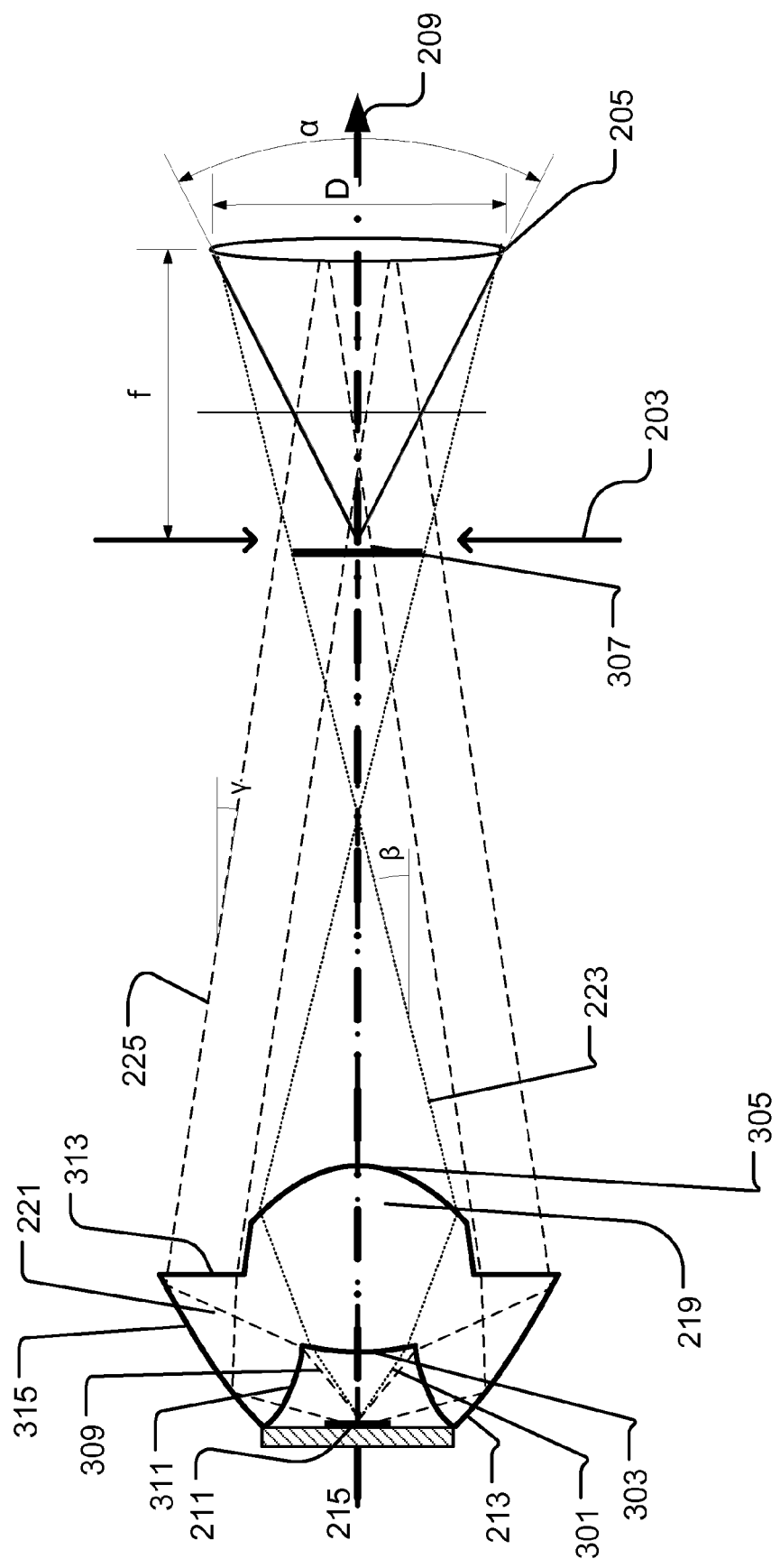
FIGS. 3a and 3b illustrate different setups of the light source and light collection means in the illumination device according to the present invention.

FIG. 3a illustrates an example of a light source 211 and its corresponding light collection means 213 used in the illumination device according to the present invention. The light from the light source and the light collection means creates a light source light beam propagating along a source optical axis 215.

The light collection 213 means comprises a central lens part 219 collecting a central part 301 of the light generated by the light source and generates a first source light beam part 223 (illustrated by dotted lines). The central lens 219 comprises a central entrance surface 303 and a central exit surface 305 which refract the central light beams 301 such that an image 307 of the light source is created at a distance along the source optical axis 215. The central lens part can be adapted to provide a magnified, demagnified or 1 to 1 image of the light source. The first source light beam part 223 has a divergence angle $\beta$ in relation to the source optical axis 215. The divergence angle $\beta$ of the first source light beam in relation to the source optical axis is defined by the optical properties of the central lens and the size of the light source.

The light collection means 213 also comprises a peripheral lens part 221 at least partially surrounding the central lens part 219. The peripheral lens 221 comprises an entrance surface 311, an exit surface 313 and a reflective surface 315. The second part 309 of the light generated by the light source enters the peripheral lens through the entrance surface 311; it is thereafter reflected by the reflection surface 315 and exits the peripheral lens through the exit surface 313. The reflection on reflection surface 315 can for instance be based on total internal reflection or the reflection surface can comprise a reflective coating. The peripheral lens thus collects a second (peripheral) part 309 of the light generated by the light source 211 and generates a second source light beam part 225 (illustrated by dashed lines). The relationship between the entrance surface, the reflection surface and the curvature of the surfaces defines the appearance of the second source light beam, and the second light source beam has a divergence $\gamma$ in relation to the source optical axis 215. Although it appears like the inner and outer light rays of the second source light beam have identical divergence angles in relation to the source optical axis 215, the skilled person would realize that the peripheral lens can be adapted to provide different divergence angles for the inner light rays and the outer light rays. The central part and the peripheral part of the light collecting means can be designed to have different divergent angles, and/or intensity distributions in the aperture. The particular design and combination of the two parts can thus be used to control the light distribution in the aperture.

The second light beam part 225 is in the illustrated step adapted to slightly surround the image 307 of the light source in proximity to the aperture, and the second light beam part can, in this situation, compensate for a potential mismatch between the shape of the light source and the aperture—e.g. in the case where the light source is rectangular and the aperture is circular. The second source light beam part 225 can in this situation fill out missing parts in the aperture. Today, for instance most LEDs, are embodied as a rectangle in order to match the requirements for display system/video projectors. The aperture is in contrast hereto, in connection with entertainment lighting, typically circular. It is thus possible in an efficient way to create an entertainment projecting device.

Figure 3B:
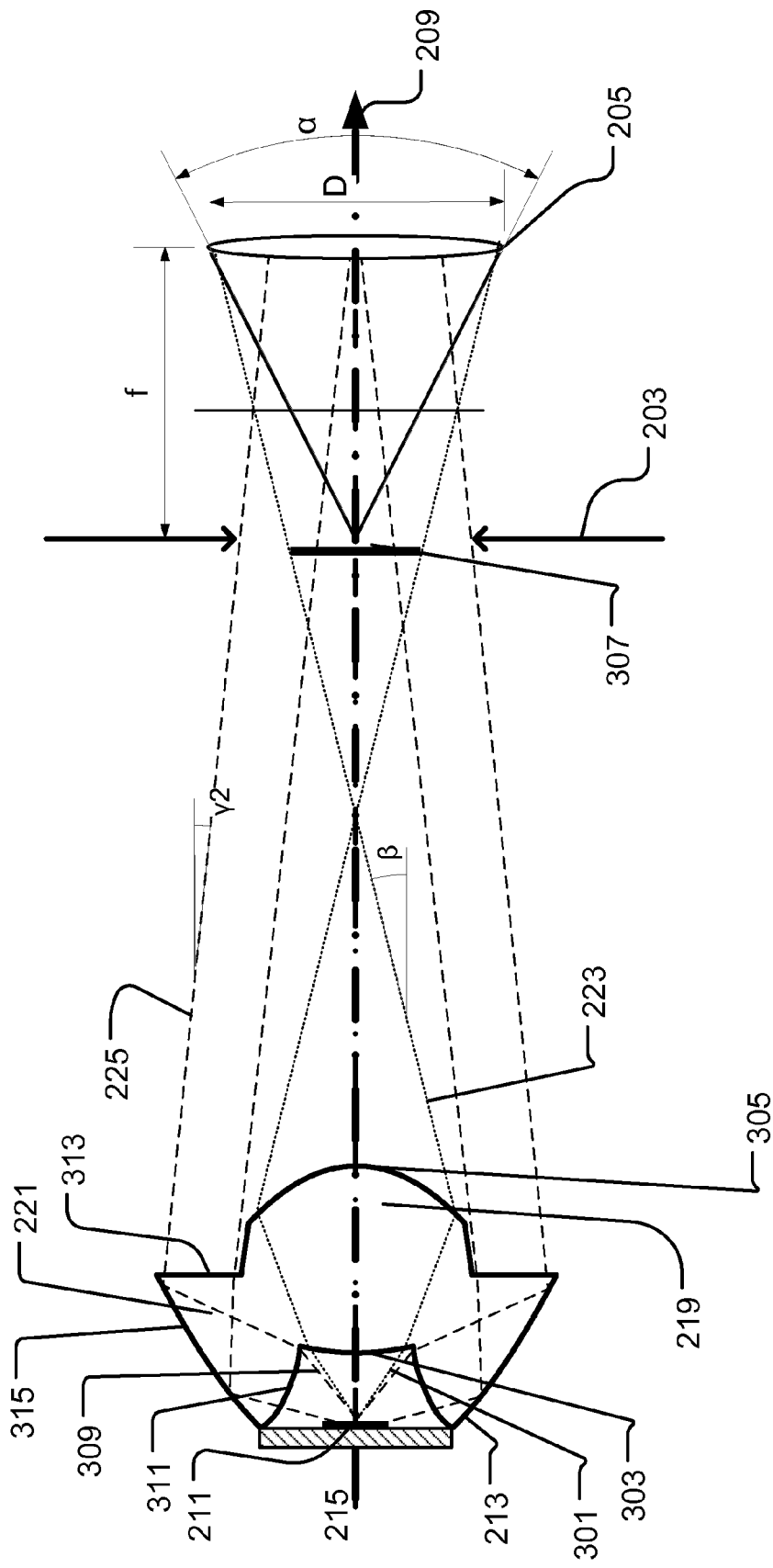

It is to be understood that the amount of the second light beam that extends the image of the light source can be increased or decreased by adjusting the optical properties of the peripheral lens part 221. FIG. 3b illustrates a situation where the amount of the second light beam that surrounds the image of the light source has been increased. The divergence angle $\gamma 2$ of the second light beam has thus been decreased compared to the divergence angle $\gamma$ of the second light beam in FIG. 3a. The second light beam can also be concentrated at the center of the image of the light source for instance in order to create a "hot" spot at the center. The divergence of the second light beam is in this situation increased.

Figure 4:
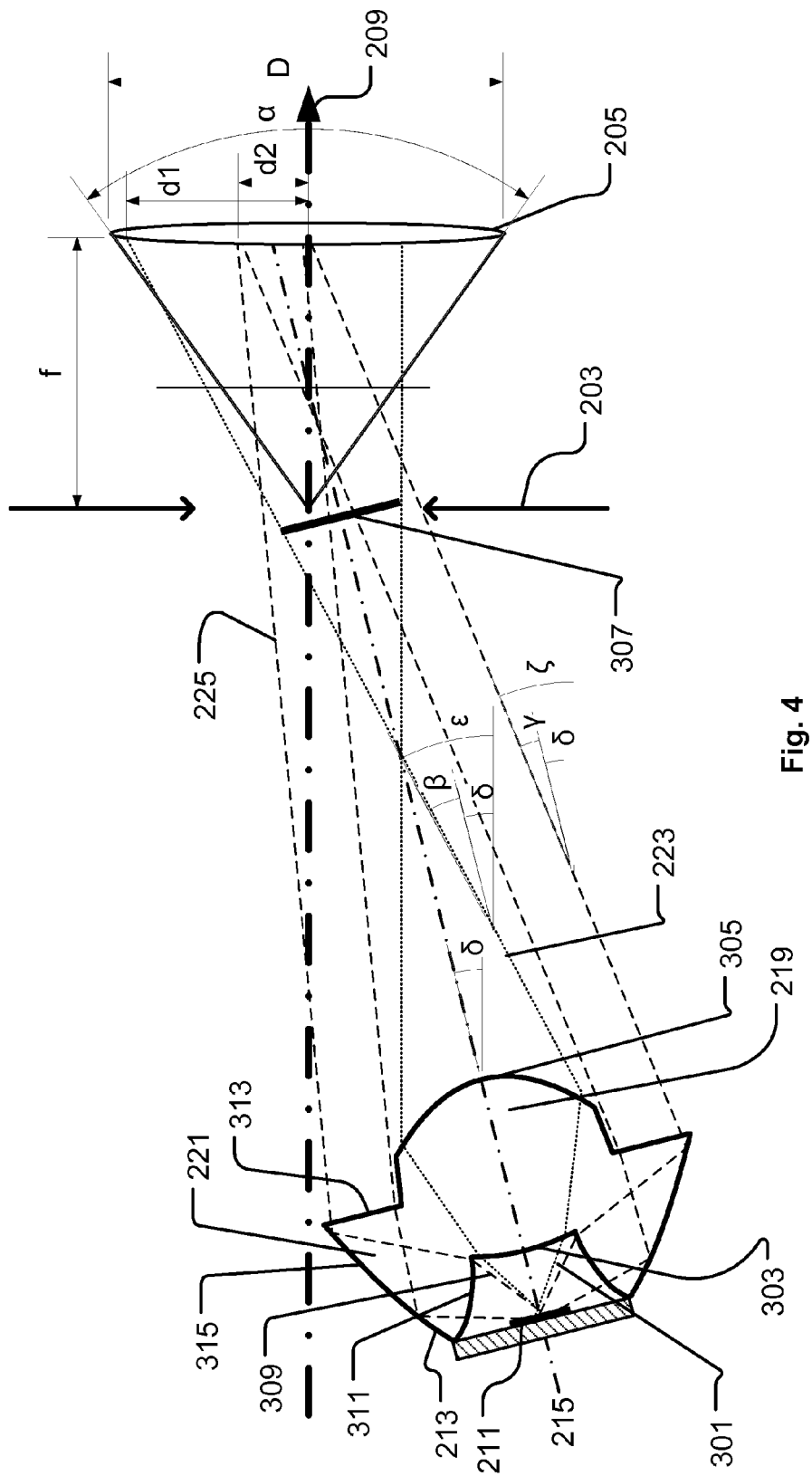
FIG. 4 illustrates a setup where the light source and the light collection means have been tilted and positioned in an offset manner.

FIG. 4 illustrates a situation where the light source 211 illustrated in FIG. 3a is positioned in a position offset and tilted in relation to the primary optical axis 209 as the case is for light sources 215a and 215c in FIG. 2a. The light source optical axis 215 is angled $\delta$ in relation to the primary optical axis. The maximum divergence angle $\epsilon$ of the first source light beam part 223 in relation to the primary optical axis 209 increases as a result of the angling of the source optical axis 215 in relation to the primary optical axis 209. The maximum divergence angle $\epsilon$ is defined as the sum of the angle $\delta$ of the source optical axis 215 in relation to the primary optical axis 209 and the divergence angle $\beta$ of the first source light beam in relation the source optical axis.

The maximum divergence angle $\zeta$ of the second source light beam part 225 in relation to the primary optical axis 209 increases in a similar way, and the maximum divergence angle $\zeta$ is defined as the sum of the angle $\delta$ of the source optical axis 215 in relation to the primary optical axis 209 and the divergence angle $\gamma$ of the first source light beam in relation the source optical axis.

The skilled person would further realize that the divergence angle of the first source light beam part 223 and the second light beam part 225 in relation to the primary optical axis 209 would decrease with regard to the light rays which lie between the source optical axis and the primary optical axis.

The light sources are in one embodiment of the present invention tilted in relation to the primary axis in such a way that the maximum divergence angles $\epsilon$ and $\zeta$ of the first source light beam part and the second source light beam part are smaller than the acceptance angle $\alpha/2$ of the projecting system 205 in relation to the primary optical axis. This ensures that projection system 205 is capable of collecting the light.

The light sources are further in one embodiment positioned such that the maximum distance/height d1 of the first source light beam part in relation to the primary optical axis at the entrance pupil 401 is smaller than the height of D/2 defined by the resulting acceptance area of the projecting system. The maximum distance/height d2 of the second source light beam part in relation to the primary optical axis at the entrance pupil 401 is similar in one embodiment and is also smaller than the height of D/2 defined by the resulting acceptance area of the projecting system. This ensures that the light rays hit the entrance pupil of the projecting system and thus are also collected by the projecting system if the light rays also lie within the acceptance angle of the projecting system.

The person skilled in the art will realize that these requirements can be fulfilled for instance by optimizing the optical properties of the light collecting means 213 or projecting system 205, by optimizing the tilting and positioning of the light sources, by adapting the aperture etc.

The image 307 is in the illustrated setup angled in relation to the primary optical axis 209, but it is also possible to adjust the optical properties of the central lens part so that the image is perpendicular to the primary optical axis. This can for instance be achieved by tilting the central lens part.

For simplicity, FIGS. 3a, 3b and 4 illustrate one light source, but the skilled person will realize that a plurality of light sources can be used. Further, the figures illustrate only a few setups, and the person skilled in the art will be able to construct other embodiments within the scope of the claims.

Figure 5A:
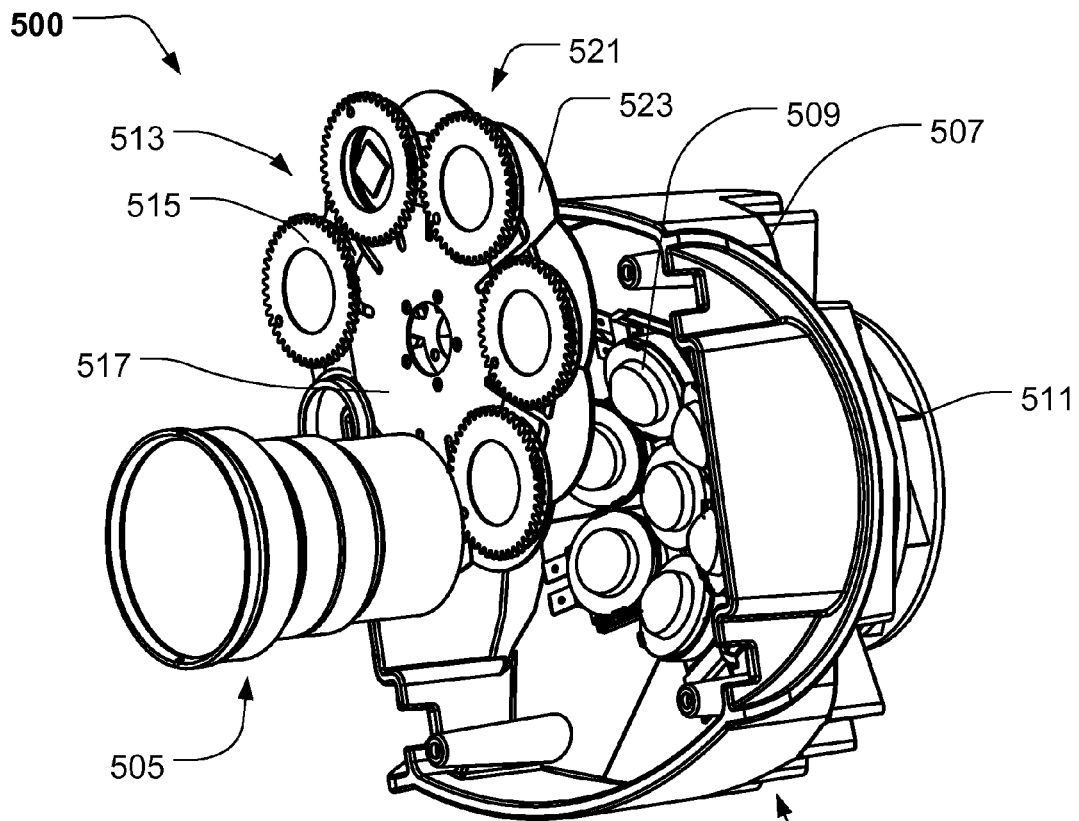
FIGS. 5a and 5b illustrate an embodiment of the illumination device according to the present invention.
Figure 5B:
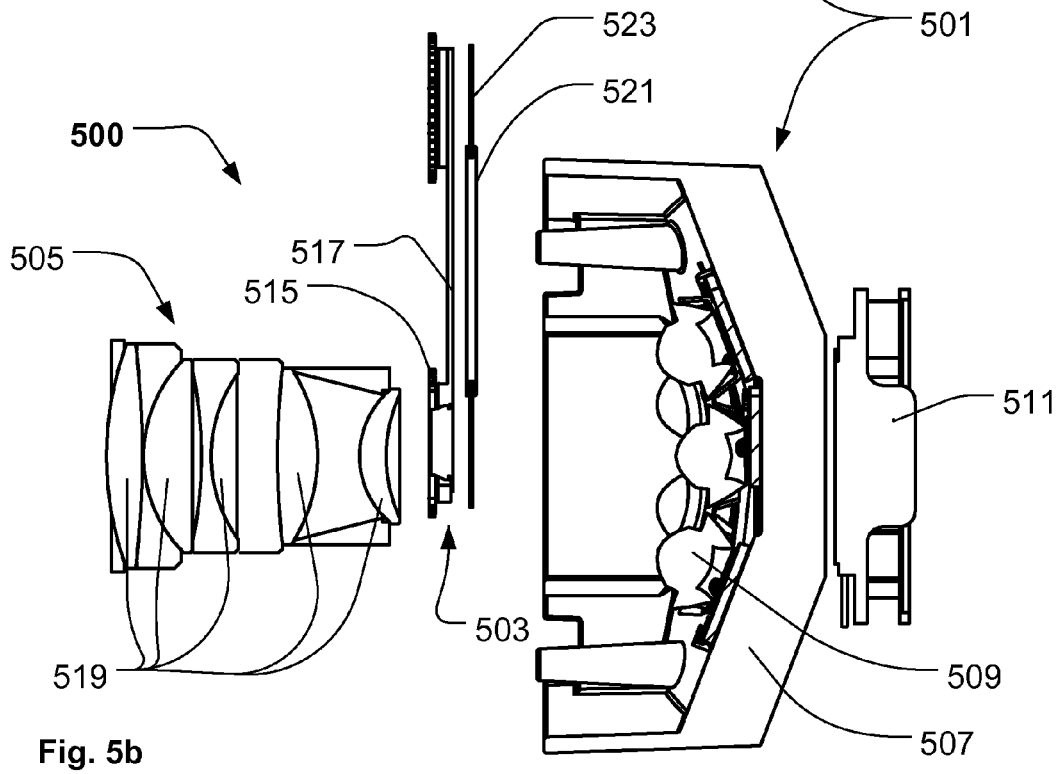

FIGS. 5a and 5b illustrate a possible embodiment of the illumination device according to the present invention, where FIG. 5a and FIG. 5b, respectively, illustrate a perspective view and a cross sectional view of the illumination device. The illumination device is here embodied as a gobo projector 500 adapted to image the gobo onto a target surface. The gobo projector comprises a light source module 501, aperture 503 and projecting system 505 arranged as described above.

The light source module comprises a number of LEDs mounted onto a cooling module 507 (illustrated in further detail in FIGS. 6a and 6b) and below a number of TIR (Total Internal Reflection) lenses 509. The light source module further comprises blowing means (511) in the form of a fan adapted to force air towards a number of cooling fins on the backside of the cooling module. The TIR lenses act as light collecting means and collect and direct, as described above, the light from the LEDs towards the aperture and projecting system.

The gobo projector 500 comprises a gobo wheel 513 comprising a number of gobos 515 mounted on a rotating carousel 517 as known in the art of entertainment lighting. The gobo wheel can for instance be embodied as described in U.S. Pat. No. 5,402,326, U.S. Pat. No. 6,601,973, U.S. Pat. No. 6,687,063 or US2009/0122548 incorporated herein by reference. Each gobo can be moved into aperture 503 by rotating the carousel. The projecting system is adapted to create an image of the gobo at a target surface (not shown) and comprises a number of optical lenses 519.

The illustrated gobo projector further comprises a color wheel 521 comprising a number of optical filters 523 (e.g. dichroic filters, color gels or the like) which can also be positioned into the light beam. The color wheel is useful in the case that the light sources produce a white light beam and can be used to create a certain color of the light beam. The color wheel is, however, optional, as it can be omitted in the case where the light sources are of different colors and adapted to perform additive color mixing as known in the art of dynamic lighting. This is for instance possible by having a number of red, green and blue LEDs where the color mixing is based on the intensity of the different colors. The intensity of the different colors can for instance be controlled by the commonly known pulse width modulation (PWM) method, or by adjusting the DC current through each color LED.

Figure 6A:
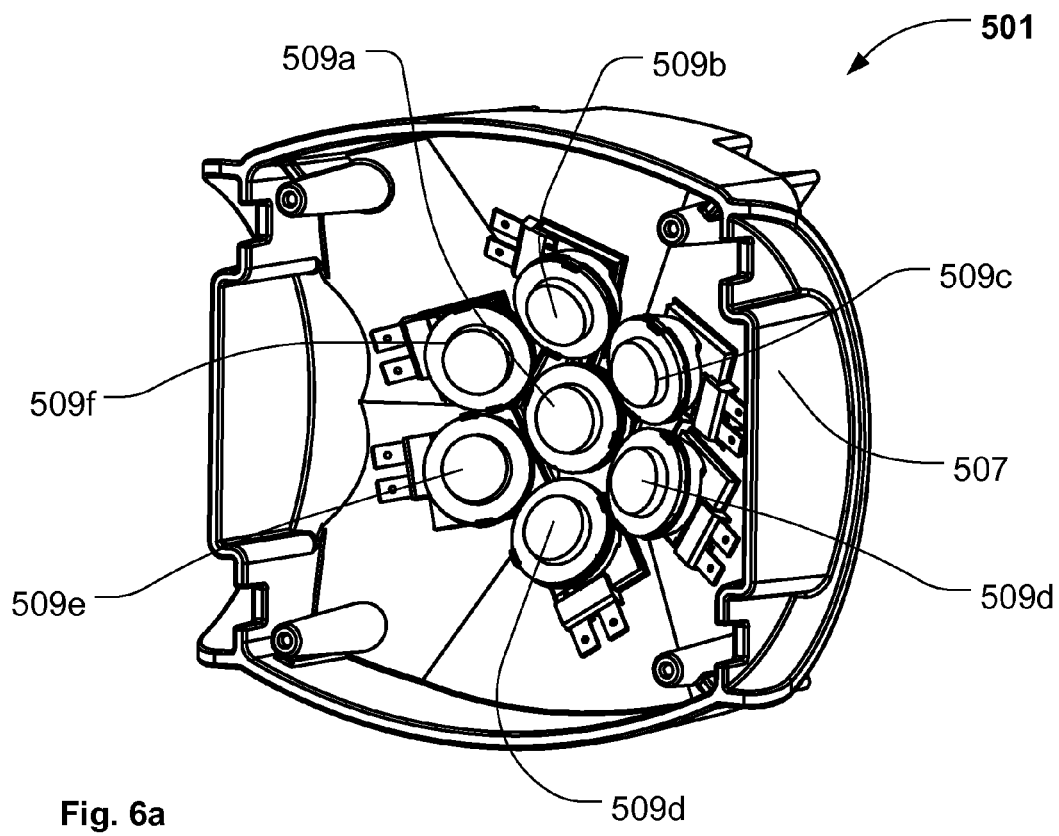
FIGS. 6a and 6b illustrate a cooling module used in the illumination device illustrated in FIGS. 5a and 5b.
Figure 6B:
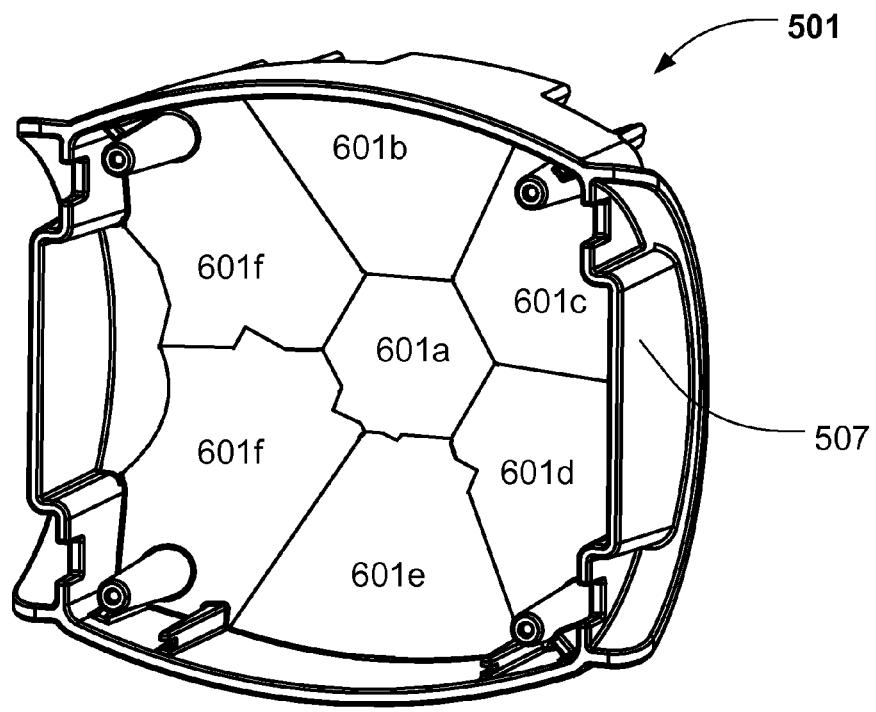

FIGS. 6a and 6b illustrate a perspective front view of the light source module 501 used in the gobo projector illustrated in FIGS. 5a and 5b. FIGS. 6a and 6b illustrate the light module with LEDs and without LEDs, respectively. The light source module comprises a cooling module 507 having a first side comprising a number of plane mounting surfaces 601a-601f whereto a LED and its corresponding TIR lens (509a-509f) are mounted. Center mounting surface 601a is mounted perpendicularly to the optical axis, and the LED and TIR 509a lens are positioned such that the primary optical axis goes through the LED and TIR lens 509a. The peripheral mounting surfaces 601b-601f are angled relative to mounting surface 601a, and the light from the LEDs is directed towards the aperture. The angle of the peripheral mounting surfaces is determined such that the light emitted by the LEDs will hit the projecting system within the acceptance angle and cross section of the projecting system as described above. The plane mounting surfaces make it possible to mount the LEDs on plane circuit boards secured to the plane mounting surfaces. The result is that the heat generated by the LED can be dissipated from the circuit board through the plane mounting surfaces very easily as it is possible, in contrast to curved mounting surfaces, to provide tight contact over a large contact surface between the circuit board and the plane mounting surface. The different mounting surfaces are further interconnected resulting in the fact that heat from neighboring LEDs can be dissipated at least partially away through the neighboring mounting surface. This is useful in the case where different color LEDs are used and where some LEDs might periodically be turned off. LEDs which are turned on can in this case use the mounting surface and heat sink area related to turned off LEDs whereby more heat can be dissipated. The second side, which is opposite the first side, of the cooling module can comprise a number of cooling fins improving the cooling effect of the LED.

Figure 7A:
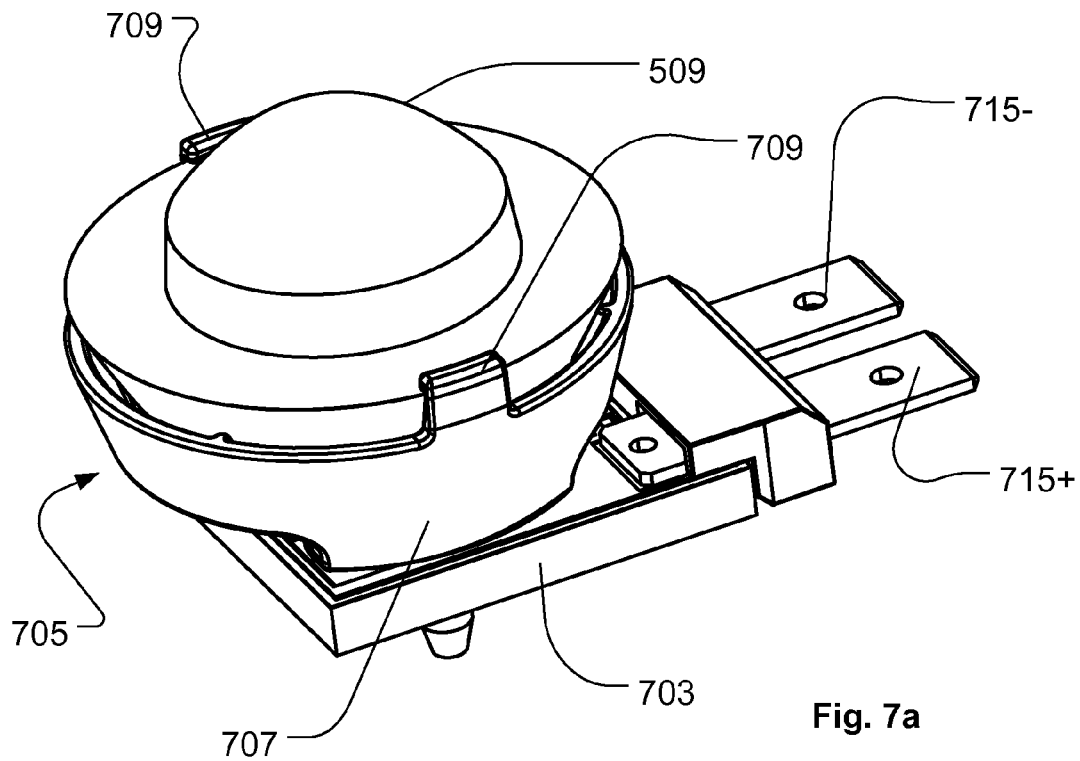
FIGS. 7a-7e illustrate a light source and a light collector used in the illumination device in FIGS. 5a and 5b.
Figures 7B, 7D:
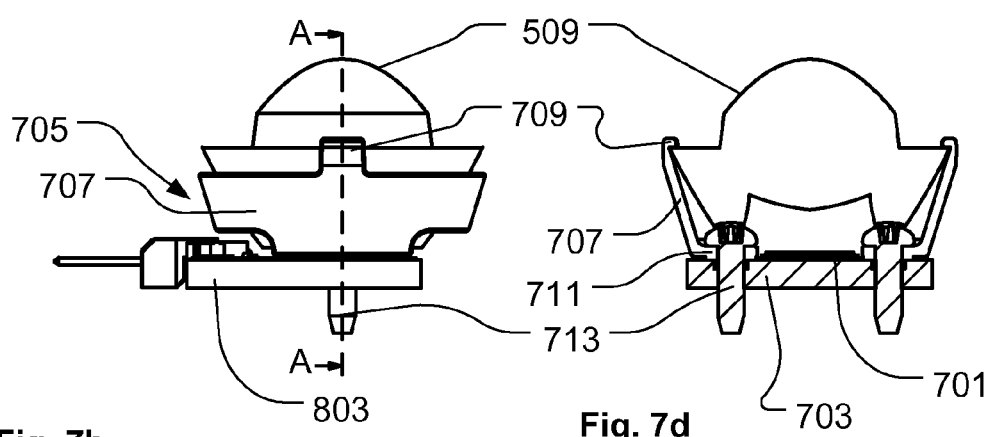
Figures 7C, 7E:
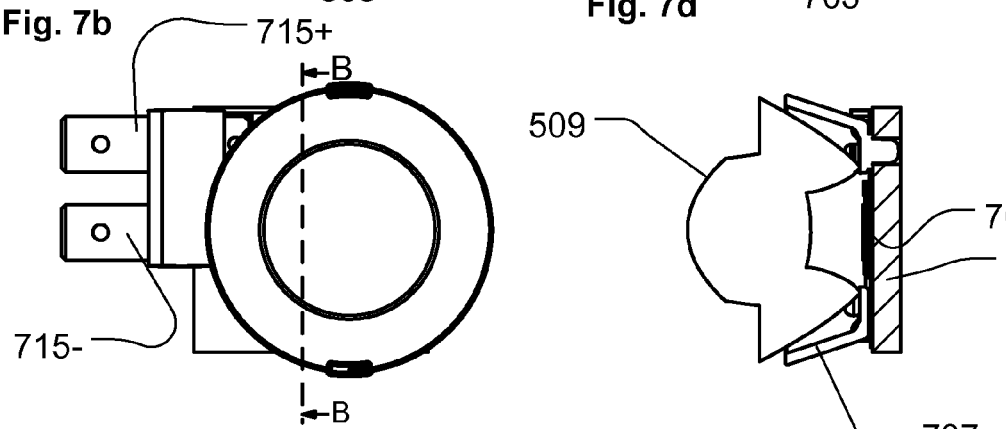

FIG. 7a-7e illustrate a LED module used in the gobo projector illustrated in FIGS. 5 and 6. FIG. 7a illustrates a perspective view, FIG. 7b a side view, FIG. 7c a top view, FIG. 7d a cross section view along line A-A of FIG. 7b and FIG. 7e a cross section view along line B-B of 7c.

The LED die 701 is mounted on a metal core circuit board 703, and the TIR lens 509 is secured to the metal core circuit board by a lens holder 705. The lens holder comprises main body part 707 at least partially surrounding the TIR lens 509.

The lens holder further comprises a number of engaging hooks 709 protruding from the main body 707 and adapted to engage with the upper part of the TIR lens. The TIR lens is thus positioned inside the main body and is secured by the engaging hooks 709. The main body 705 is through two securing holes 711 secured to the circuit board by two screws, nails, rivets or the like 713. The securing holes extend in the illustrated embodiment inwardly in the main body 707 but can also extend outwardly from the main body. The circuit board comprises two leads (one negative 715− and one positive 715+) whereto electrical power for driving the LED can be connected.

The TIR lens is embodied as a light collector collecting light emitted by the LED and comprises a central lens part aligned along the optical axis of the LED axis and having a central entrance surface and a central exit surface. The TIR lens also has a peripheral lens surrounding at least a part of the central lens. The peripheral lens comprises a peripheral entrance surface, a peripheral reflection surface and a peripheral exit surface.

Figure 8A:
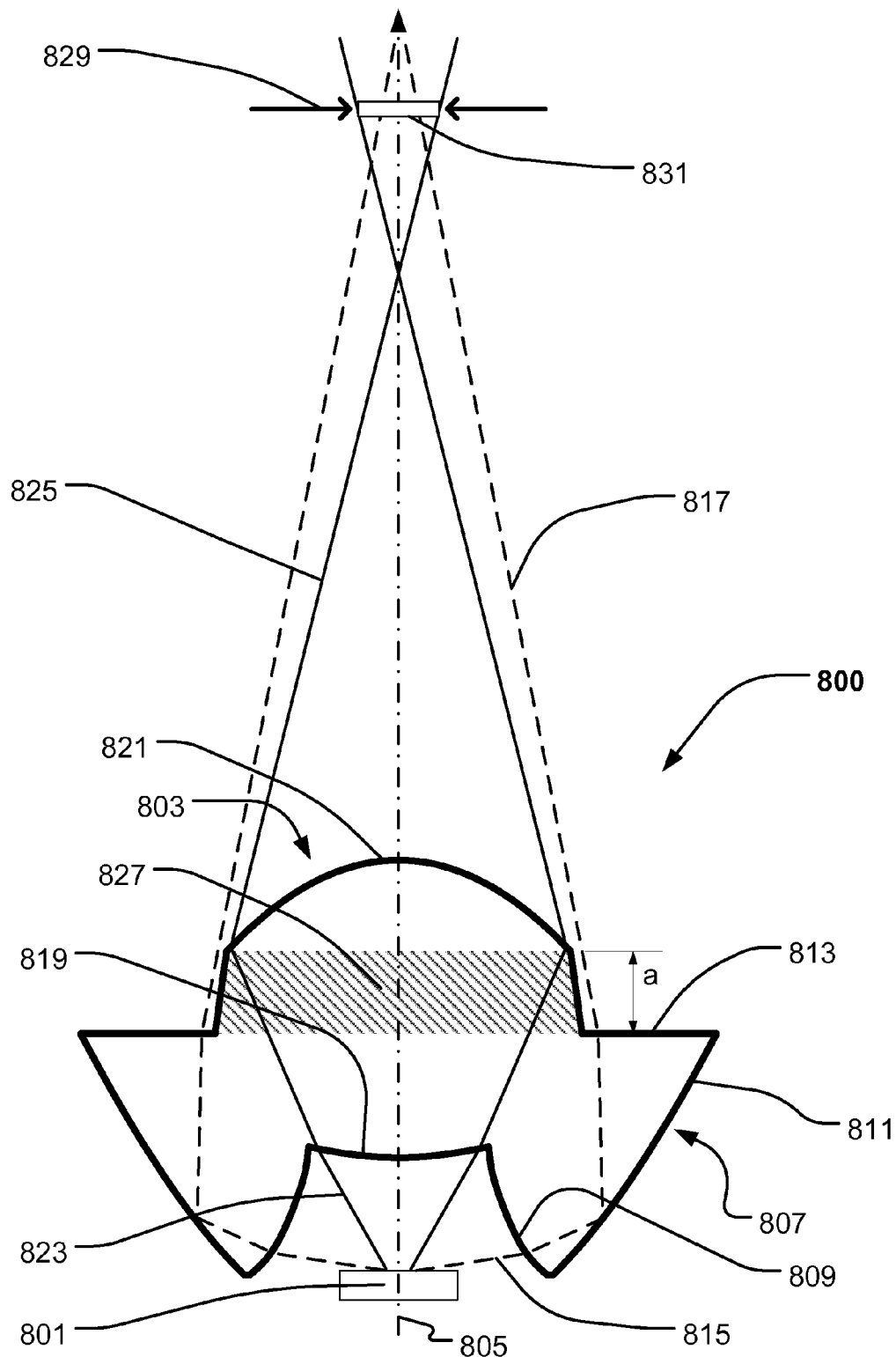
FIGS. 8a and 8b illustrate a light collector according to the present invention.

FIG. 8*a* illustrates a light collector 800 according to one aspect of the present invention according to the present invention. The light collector collects light emitted by a light source 801 and converts the collected light into a light beam. The light collector comprises a central lens part 803 aligned along the optical axis 805 of the light source and a peripheral lens part 807 surrounding at least a part of the central lens 803.

The peripheral lens part comprises a peripheral entrance surface 809, a peripheral reflection surface 811 and a peripheral exit surface 813. The peripheral part 815 of the light emitted by the light source enters the peripheral lens part through the peripheral entrance surface and is reflected by the peripheral reflection surface before leaving the peripheral lens through the peripheral exit surface 813. The peripheral part of the emitted light is hereby converted into a second light beam part 817.

The central lens part comprises a central entrance surface 819 and a central exit surface 821. A central part of the light 823 emitted by the light source enters the central lens through the central entrance surface 819 and leaves the central lens through the central exit surface 821 whereby the central part of the emitted light is converted into a first light beam part 825. The central lens also comprises an extension part 827 (marked as a scratched area) positioned between the central entry surface and the central exit surface. The extension part protrudes from the peripheral exit surface 813 and elevates the central exit surface a distance above the peripheral exit surface. The first and second light beam parts can for instance be coupled through an aperture 829 along the optical axis.

This light collector has reduced cross section dimensions compared to traditional light collectors. The cross section dimensions of the light collector can be reduced by providing the central lens part with an extension part, as the cross section dimension defined by the peripheral part can be reduced without changing the optical properties of the central lens part. It is thus possible to position a multiple number of light sources close together in an array and increase the efficiency as the amount of light that can be coupled through the aperture is increased. To combine light from several sources and light collectors into an aperture within a limited acceptance angle defined by the projection optics in an efficient way requires light collectors which deliver light in the aperture with the smallest possible divergent angle. To obtain the smallest divergent angle from the center part of the light collector, the lens should have as long a focal length as possible and be positioned to image the source as infinity. This means that moving the lens further away from the light source decreases the divergent angle from the center part. Moving the peripheral exit surface 813 of a fixed the TIR lens having a maximum diameter further away from the aperture reduces the maximum divergent angle of the light from the peripheral exit surface. Therefore, to deliver maximum light from the source within a limited divergent angle, the center part of the light collector should have a center lens part extended with respect to the peripheral part.

The central lens part is in one embodiment adapted to provide an image 831 of the light source a distance along the optical axis. The aperture 829 can in this way be illuminated in a way whereby most of the central part of the light emitted by the light source is coupled through the aperture. A very efficient incoupling of light through the aperture 829 is provided. It is further possible to create a projecting system where most of the central light is coupled into a projecting system (not shown in FIG. 8).

The image of the light source can be inscribed by the second light beam part. This is useful in the case that the shape of the light source is different from the shape of an aperture along the optical axis, as the second light beam part can be used to fill out missing parts of the image of the light source.

The central lens part can also be adapted to distort the image of said light source. It is in this way possible to deform the image of the light source such that it matches the shape aperture.

The peripheral lens part can be adapted to concentrate the peripheral part a distance along said optical axis. It is in this way possible to provide a "hot" spot along the optical axis.

In another embodiment the peripheral lens part and the central lens part can be adapted to a specific combined light distribution in the aperture 829 as wished.

Figure 8B:
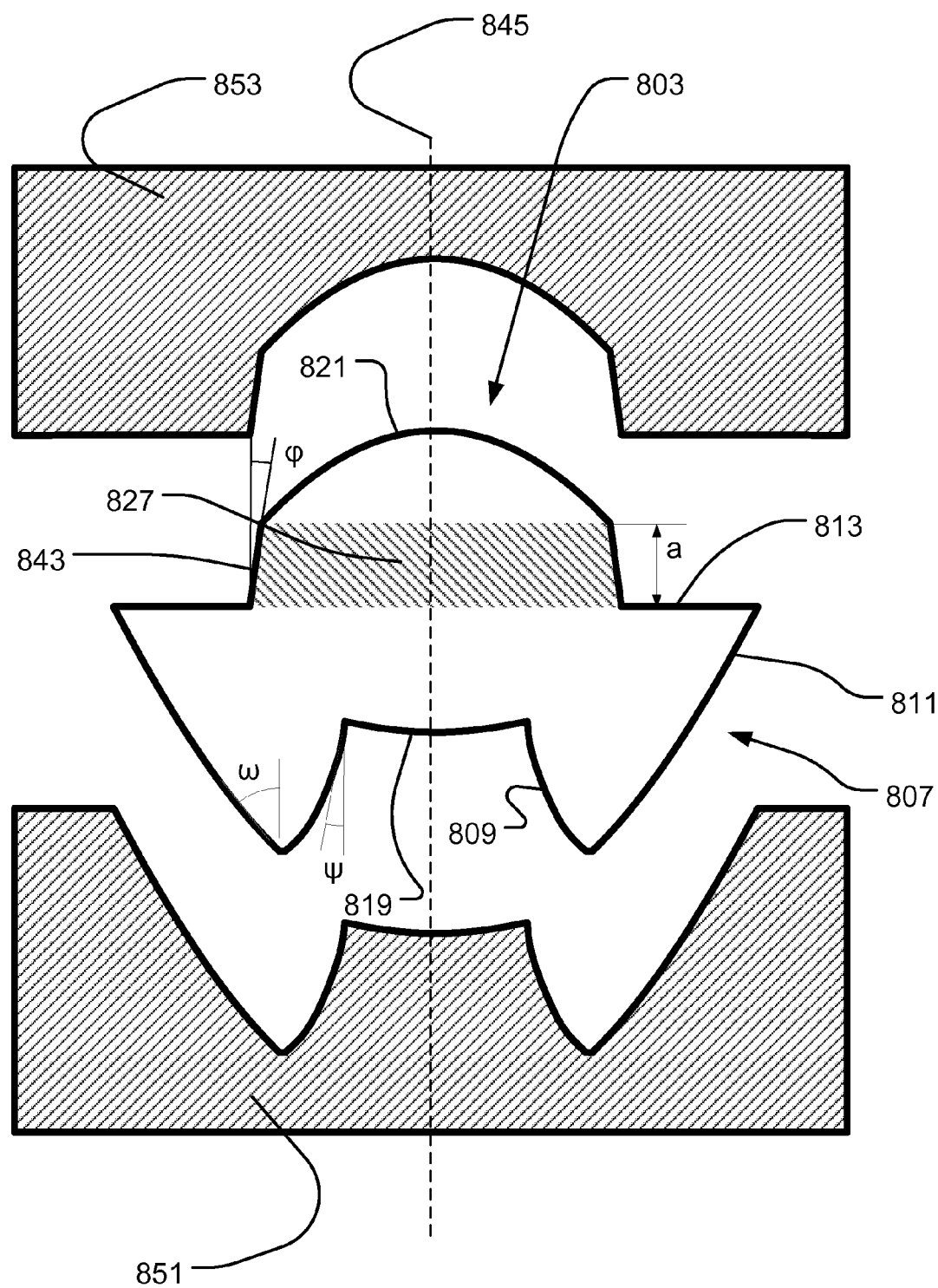

FIG. 8*b* illustrates the light collector 800 in connection with a lower molding tool 851 and an upper molding tool 853. The molding tools are moved together along the central axis 845 of the light collector, and the light collector material is hereafter filled (not shown) into the cavity between the two molding tools. The slip angle $\phi$ of the outer surface 843 of the extension part, the slip angle $\psi$ of the peripheral entrance surface 809 and the angle $\omega$ of the peripheral reflection entrance surface 811 are at least 1 degree in relation to central axis 845 of the light collector. This ensures that the molding tools can be moved away from each other without destroying the light collector.

Figures 9A, 9B:
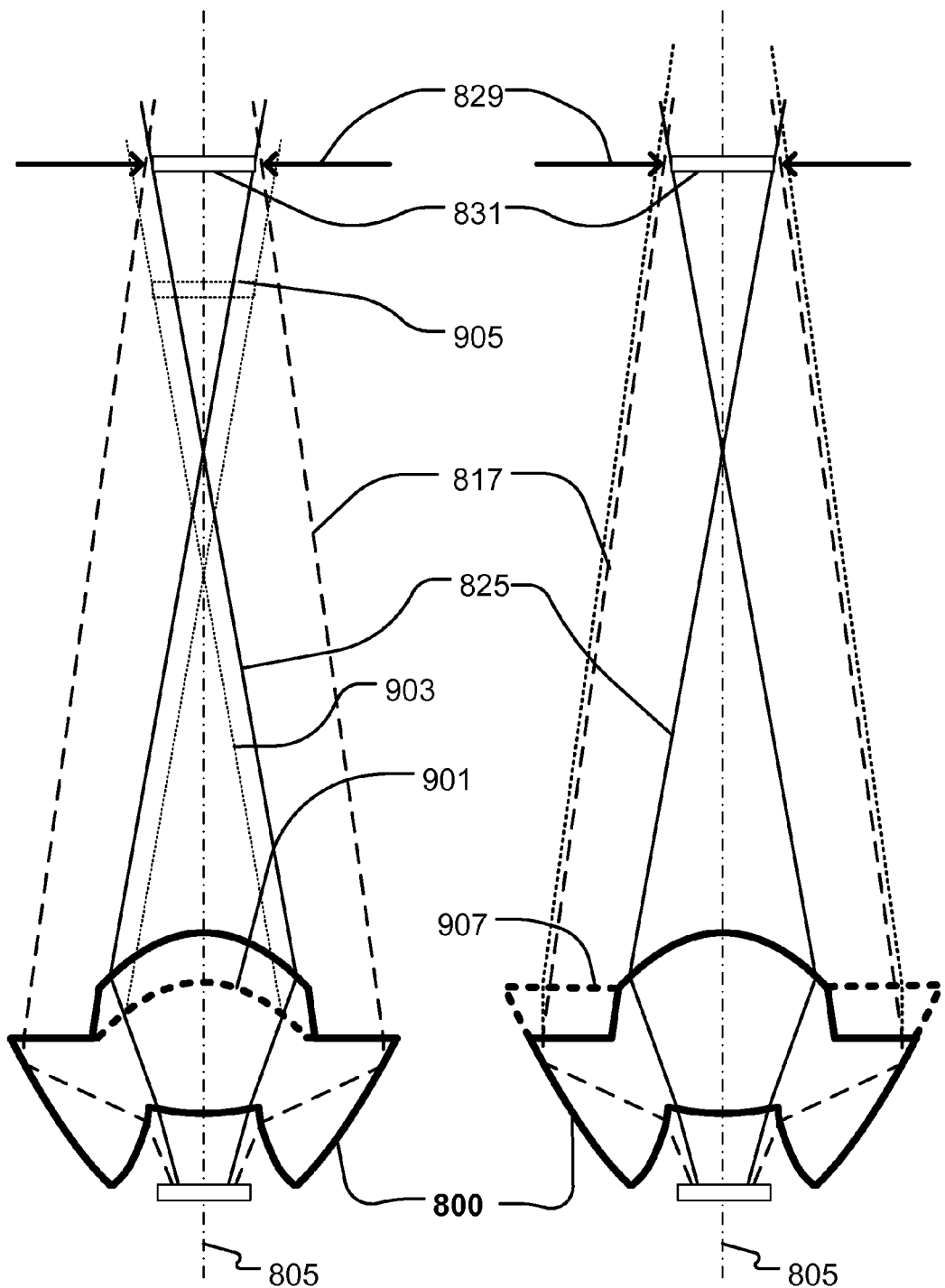
FIGS. 9a and 9e compare the performance of the light collector according to the present invention with light collectors according to prior art.
Figure 9C:
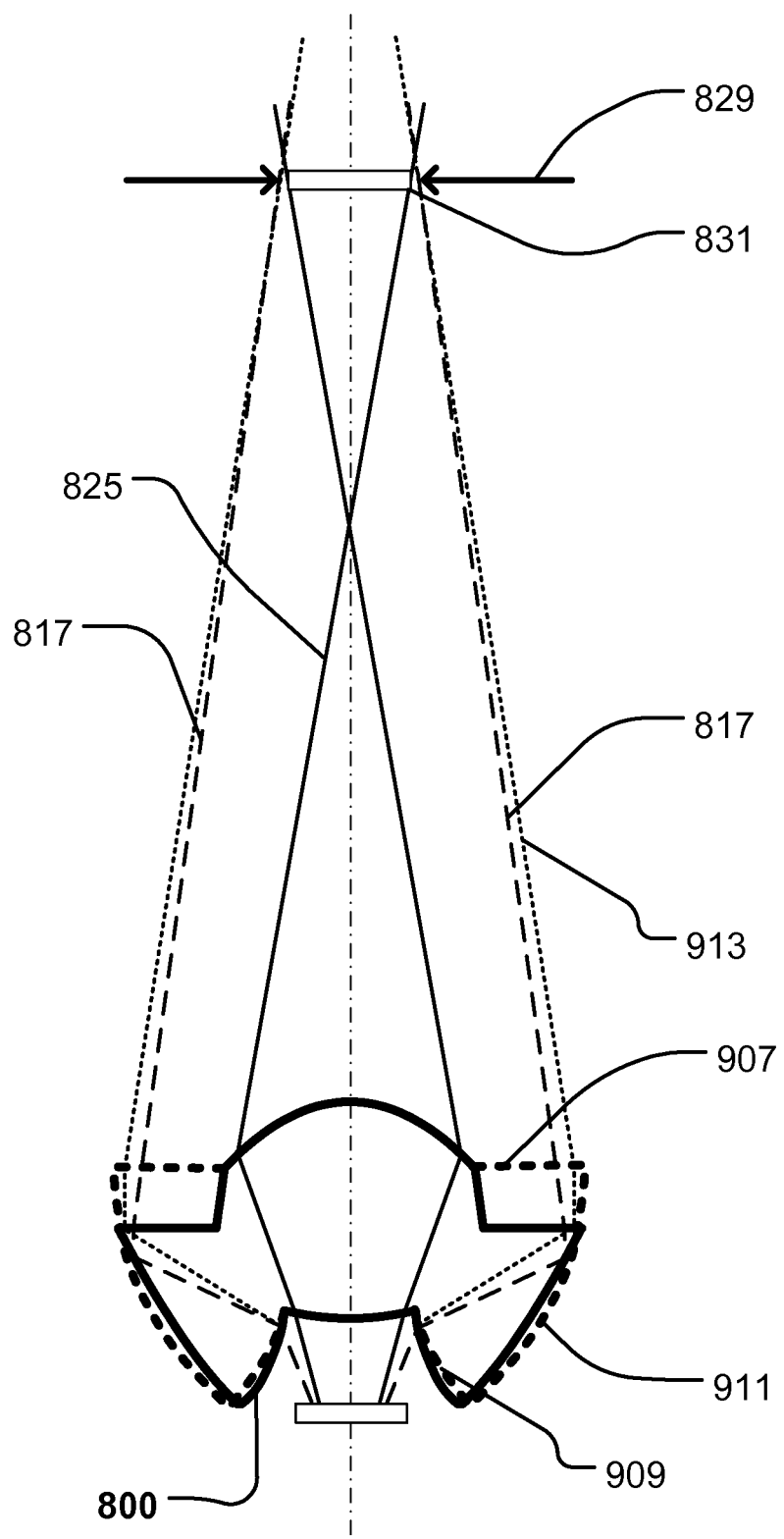

FIG. 9*a*-9*c* compare the light collector according to the present invention with light collectors according to prior art and illustrate the basic principles of a situation where the light from the light source is coupled through an aperture.

The light collector 800 according to the present invention is in FIG. 9*a*-9*d* illustrated in solid lines, and the part of a prior art light collector which differs from the light collector 800 is illustrated in dotted lines 901. The principles of the light collector 800 according the present invention are described in FIG. 8, and the first light beam part 825 is in the illustrated situation adapted to provide an image of the light source at the aperture 829 which matches the size of the aperture. The second light beam part 817 is also adapted to match the size of the aperture. Most of the light collected by the light collector propagates thus along optical axis 805 and is thus coupled through the aperture 829.

FIG. 9*a* illustrates the first light beam part 903 (in dotted line) of a central part of a light collector 901 according to prior art having the same cross section dimensions as the light collector 800 according to the present invention. It can be seen that the first light beam part 903 from the prior art light collector is larger than the size of the aperture at the aperture plane, and this light is thus lost. The image of the light source created 905 by the prior art light collector 901 is pulled away from the aperture.

FIG. 9*b* illustrates a situation where the central part of the prior art light collector has the same optical characteristics as the central part of the light collector according to the present invention. The peripheral part 907 of prior light collector is in this situation larger in both height and cross section. It is thus possible to position a larger number of light sources and light collectors in a given area when using the light collector 800 according to the present invention. This is useful when light from multiple light sources needs to be coupled through an aperture and projected by a projecting system, as more light can be held within the limit of the acceptance angle and cross section of the projecting system. The second light beam 909 (in dotted lines) created by the peripheral part of the prior art light collector will be increased at the aperture, resulting in loss of light.

FIG. 9*c* illustrates a situation where the central part of the prior art light collector has the same optical characteristics as the central part of the light collector according to the present invention. The prior light collector is in this situation adapted to have the same cross section as the cross section of the light collector according to the present invention. The entrance surface 909 and reflection surface 911 of the peripheral part 907 is as a consequence change in order to direct the peripheral part of the emitted light towards the aperture 829. The peripheral part 907 of the prior art light collector is in the illustrated figure adapted to concentrated the light 913 such that the light passes through the aperture 829. The divergence angle of the outermost light beam 913 from the peripheral part 907 in relation to the optical axes is increased compared to the divergence angle of the outermost light beam 817 from the peripheral part of the light collector according to the present invention.

It is thus possible to position a larger number of light sources and light collectors in a given area when using the light collector 800 according to the present invention. This is useful when light from a multiple numbers of light sources need to be coupled through an aperture and projected by a projecting system, as more light can be held with in the limit of the acceptance angle and cross section of the projecting system. The second light beam 909 (in dotted lines) created by the peripheral part of the prior art light collector will be increased at the aperture, resulting in loss of light.

Figures 9D, 9E:
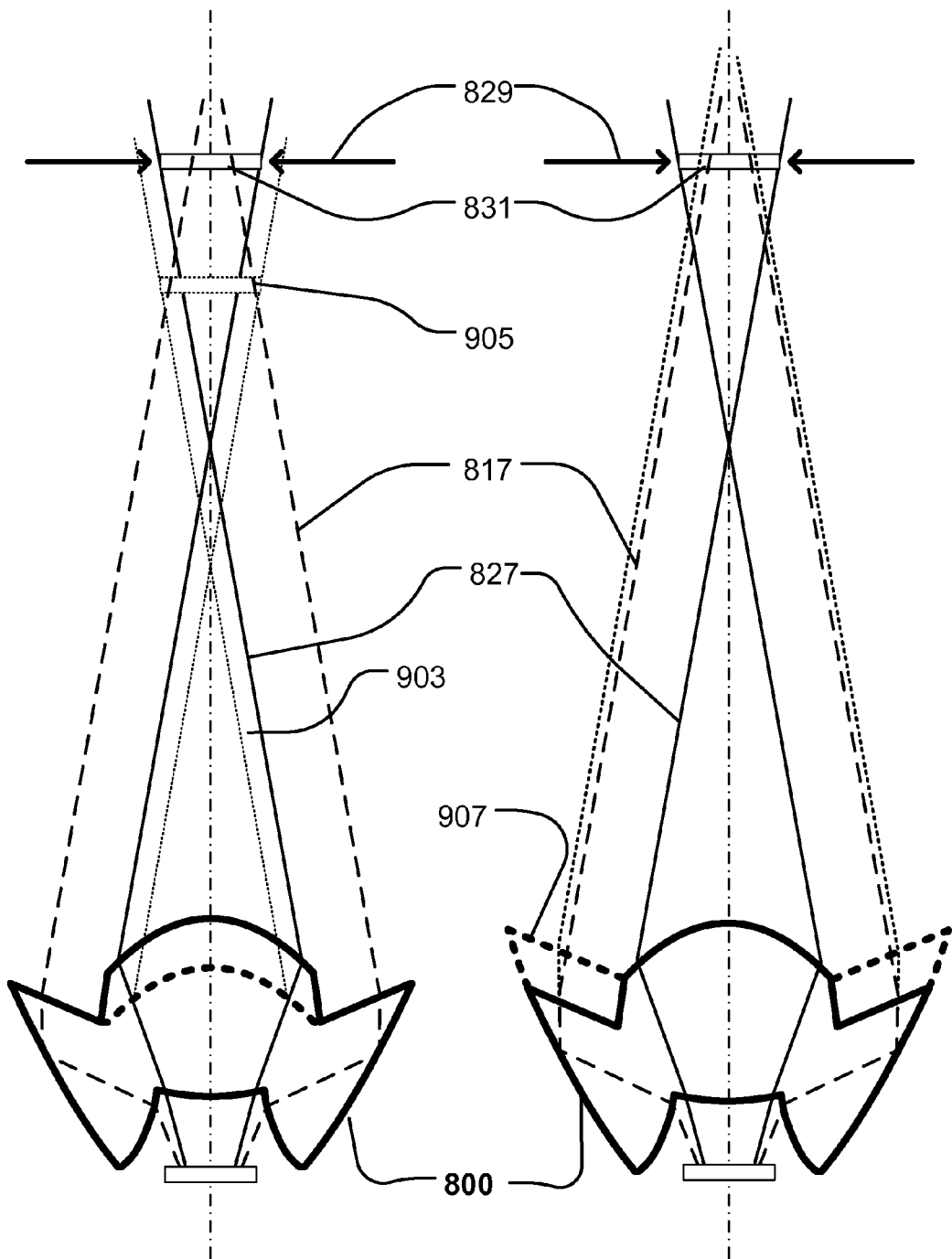

FIGS. 9*d* and 9*e* correspond to FIGS. 9*a* and 9*b*, respectively, with the difference that the exit surface of the peripheral lens part has been angled in order to focus the second light beam part further.

The embodiments have been described in view of the case where an image of the light source is created in proximity to the aperture; however, the skilled person will understand that it is possible to carry out the present invention with regard to overlapping and non overlapping light beam parts in a similar way. The skilled person will further realize that the width of a light beam or optical image does not have completely sharp edges and that the width can be obtained in many different ways for instance as defined by commonly used methods such as, D4σ, 10/90 or 20/80 knife-edge, 1/e2, FWHM and D86.

FIG. 10*a*-10*f* illustrates perspective views of different embodiment's of a light collector according to the present invention. The light collector is adapted to collect light emitted by a light source (not shown) and converting the collected light into a light beam. The light collector comprises a central lens part 1003 aligned along an optical axis 1005 of the light source and a peripheral lens part 1007 surrounding at least a part of the central lens. The central lens comprises a central entrance surface (not visible) and a central exit surface 1021 and the peripheral lens comprises a peripheral entrance surface (not visible), a peripheral reflection surface 1011 and a peripheral exit surface 1013.

The light source is positioned in a cavity below the central lens and surrounded by a part of the peripheral lens in as similar manner as illustrated in FIGS. 8 and 9. The central part of the light emitted by the light source enters the central lens through the central entrance surface and leaves the central lens through the central exit surface 1021. In this way the central part of the emitted light is converted into a first light beam part having a first cross sectional light distribution. The peripheral part of the light emitted by the light source enters the peripheral lens through the peripheral entrance surface and is reflected by the peripheral reflection surface 1011 before leaving the peripheral lens through the peripheral exit surface 1013. In this way the peripheral part of the emitted light is converted into a second light beam part having a second cross sectional light distribution.

The first and a second cross sectional light distribution define how the light is distributed across the light beam and can for instance be measured by a detector positioned in the light beam and illustrated as a gradient map. Alternatively the first and a second cross sectional light distribution can be illustrated in a coordinate system illustrating the intensity along a path through the light beam. In this embodiment the central lens and the peripheral lens are mutual adapted to convert the light emitted by the light source into a common light beam having a substantial circular and rotationally symmetric cross sectional light distribution, where the common light beam comprises the first light beam part and the second light beam part. The result is that is possible to provide a light beam with a rotational symmetric light distribution in situations where the light source is rotational asymmetric in relation the optical axis of the light source.

This is achieved as the central lens and the peripheral lens are mutual adapted such that the sum of the first light distribution and the second light distribution is substantial rotational symmetric in relation the optical axis. In situations where the light source is rotational asymmetric in relation the optical axis of the light source, the central lens typical images the shape of the light source along the optical axis and the peripheral part can then be adapted to compensate for the rotational asymmetric shaped light source. This can be achieved by adapting the peripheral part to distribute the peripheral part of the light around the image of the light source. As a result the sectional light distribution of the resulting light beam will be more rotational symmetric or circular compared to the original light distribution of the light source. It is thus possible to convert light emitted by rotational asymmetric shaped light source into a circular light beam. The rotational asymmetric shaped light source can have any rotational asymmetric shape and for instance be squared, triangular, rectangular or any other polygonal shaped.

The central lens and the peripheral lens are adapted to complement each other whereby said first cross sectional light distribution and said second cross sectional light distribution are partially inverted in relation to each other. In one embodiment the first cross sectional light distribution and the second cross sectional light distribution can be are partially inverted in relation to each other. That the second cross sectional light distribution is partially inverted in relation to the first cross sectional light distribution means that that light intensity index of the first and second cross sectional light distribution will be respectively high and low in at least some corresponding areas of the two cross sectional light distributions.

The central lens can be rotationally asymmetric in relation to the optical axis and adapted to distort the first cross sectional light distribution. The result is that the central part modifies the light distribution of the central part of the emitted light into a more rotational symmetric first light distribution. Typically most of the light emitted by the light source is emitted into the central part and the effect of providing a rotationally asymmetric central lens is thus relatively large. The peripheral lens can in this embodiment be adapted to distribute the peripheral part of the light onto areas where the rotationally asymmetric central lens cannot distort the central part of the emitted light. In fact the peripheral lens is often also rotationally asymmetric in relation to the optical axis and adapted to distort the second cross sectional light distribution. The distortion can any optical aberration or distortion known in the art, for instance a barrel distortion where magnification decreases with the distance from the optical axis, pincushion distortion where magnification increases with the distance from the optical axis, spherical distortions, spherical aberrations etc.

The rotationally asymmetric center lens can be made rotationally asymmetric by providing a rotationally asymmetric central entrance surface and/or a rotationally asymmetric central exit surface. The rotationally asymmetric peripheral lens can be made rotationally asymmetric by providing a rotationally asymmetric peripheral entrance surface; and/or a rotationally asymmetric peripheral reflection surface.

FIG. 10a-10f illustrate different embodiments and illustrate how the central lens 1003 and peripheral lens 1007 can beam symmetric and adapted to complement each other. The final design of the light collector depends on the shape and light distribution of the light source. The light collectors in can be designed to provide a circular light beam at an aperture form a rotationally asymmetric light beam using a method according to the present invention. The method comprises the steps of:
providing a light collector comprising a central lens part and a peripheral lens part as known in the art and as described above.
maximizing light output of the light beam at the aperture by rotationally symmetric adjusting the curvature of at least the peripheral entrance surface, the peripheral reflection surface; the peripheral exit surface; the central entrance surface and/or the central exit surface.

Hereafter the roundness of the cross sectional light distribution of the light beam at the aperture is optimized by rotationally asymmetric adjusting the curvature of at least the peripheral entrance surface, the peripheral reflection surface; the peripheral exit surface; the central entrance surface and/or the central exit surface. The step of optimizing the roundness of the cross sectional light distribution of the light beam comprises the step of obtaining the roundness of the cross sectional light distribution of said light beam and in that the rotationally asymmetric adjusting the curvature of at least one of said surfaces is based on said obtained roundness. This step can be repeated a number of times or until a sufficient round light beam are achieved.

The method makes it possible to design the shape of the light collector in an efficient way as less calculation need to be performed. By first optimizing the light collector using rotational symmetric adjustments of the surfaces makes possible to use prior art methods and the starting point for the rotationally asymmetric adjustments are a light collector which have already been optimized for total light output and the light output of the rotationally asymmetric light collector is most likely also high. The example below describes a possible embodiment of the method and serves only as illustrating example and does not limit the scope of the claims.

Example

The color mixing of the illumination device of FIGS. 5a and 5b was be improved by using the light collector as illustrated in FIG. 10a-10f. In the following the light collector is referred to as a NRS TIR-lens (Non-rotational-symmetric TIR lens) The TIR lenses were thus modified to project a rounder spot and provide better color-mixing. However it was deemed impractical to simulate the entire illumination device of FIGS. 5a and 5b with 7 LEDs, 7 TIR-lenses and secondary optics, a process that would take up to several minutes per optimization step. Instead, a single NRS TIR-lens was optimized by data from a 25 mm Ø gate, reducing each step to ≈6-9 seconds.

The NRS TIR-lens design was found by first optimizing a rotationally symmetric TIR-lens as illustrated in FIG. 8a for maximum luminous output in the optical gate of the illumination device of FIGS. 5a and 5b. However the skilled person realizes that any basic rotationally symmetric TIR-lens design known in the art can be used as the starting point for instance as disclosed by U.S. Pat. No. 2,254,961 or US 2009/022552.

Figure 11A:
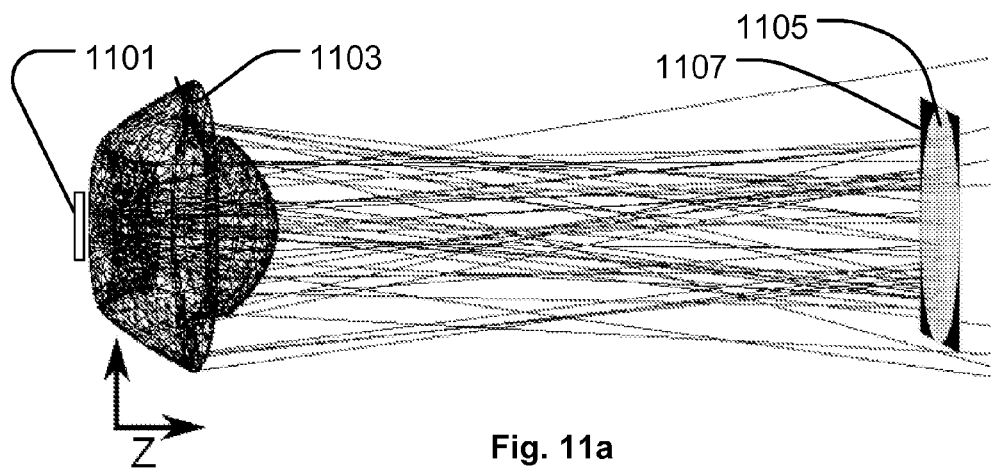

After this step, a modification was applied to compensate for the square die-image and the spot was optimized for roundness. The simulation setup is illustrated in FIG. 11a and comprises an LED light source 1101 and a TIR-lens 1103 that focus the light toward a 25×25 mm2 detector screen 1107 oriented perpendicularly to the Z-axis. In front of the detector an absorbing surface with a circular 25 mm Ø hole 1107 is situated. Simulation was done in ray-tracing software programmed by the inventors and designed to make these kinds of modifications easy to apply.

The following mechanical restrictions were applied to shape of the lens:
the largest radius from the Z-axis was set to 16 mm at a height of 11.5 mm from the bottom of the lens;
the bottom of the lens was a flat annulus shape with inner and outer radii of 8.875 mm and 9.125 mm respectively, placed at a height of 0.5 mm from the origin of the LED source defined as the center of the topmost light emitting surface;
the origin of the LED was placed 102.87 mm from the optical gate;
slip-angles were restricted to ≥2° to facilitate injection-molding production.

Figure 11B:
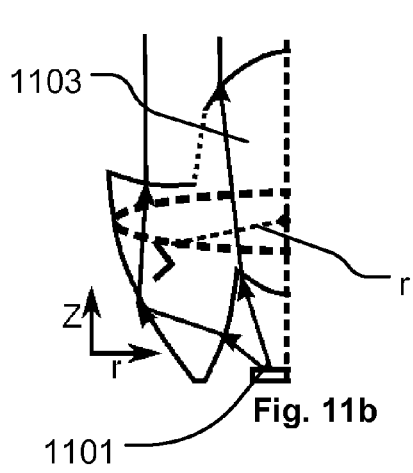

The TIR-lens was first generated as a two-parameter surface as defined by $$S(u, v) = \begin{pmatrix} r(u)\cos\left(\frac{v\pi}{2}\right) \\ r(u)\sin\left(\frac{v\pi}{2}\right) \\ Z(u) \end{pmatrix}, u, c \in [0; 1] \quad (1)$$

which describes a quarter-lens that was triangulated before ray-tracing. FIG. 11b illustrates a cross section of a rotationally symmetric lens design.

Here, f(u)=(r(u), Z(u)) is a 2D-curve—made by linking several Non-Rational-B-Spline (NURBS) curves as described by L. A. Piegl, "*On NURBS: A survey,*" *Computer Graphics and Applications, IEEE* 11, 1, 55-71 (1991) incorporated herein by reference. Non-Rational-B-Spline (NURBS) curve determine the cross-sectional profile of the lens as seen in FIG. 11b. A NURBS is a parametric curve or surface, often used as free-form objects in graphics and 3D design applications. They interpolate between a set of control vertices, not necessarily intersecting these. Each vertex can be given a weight, determining how much it 'pulls' on the NURBS, while a so-called knot-vector determines how fast the NURBS parameters will approach each consecutive vertex. The weights thus change the shape of the NURBS while the knots mainly determine the parametric progression along the curve or surface.

Figure 11C:
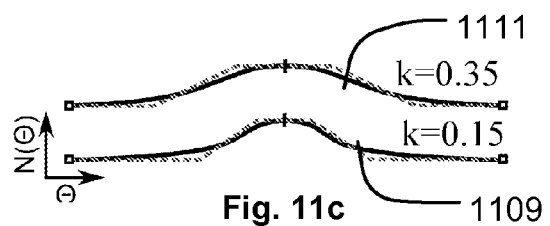

After optimization for maximum output, a contribution, N, was added to the TIR-lens in the form of a 1D NURBS curve of 2nd degree. N was assigned 6 control vertices. 0, 0, 1, 1, 0 and 0, and a knot-vector (0, 0, 0, (0.5−k), 0.5, (0.5+k), 1 1 1), with k∈[0.05, 0.45]. Large values of k will cause the NURBS to converge faster to 1 and reversely with smaller values. The effect is illustrated in FIG. 11c and is a sharpening of the peak at small values of k (curve 1109) and a broadening at larger values (curve 1111) which respectively shows N at k=0.35 and k=0.15. At a value of k=0.25, N will almost match a sine-curve. Further information about how the knot-vector works can be found in D. Solomon, *Curves and Surfaces for Computer Graphics* (Springer Verlag, 2005) incorporated herein by reference.

The modified quarter-lens, S', is then defined as:

$$S'(u,v,k) = \begin{pmatrix} r(u) + r'(u)N(k,v)\cos\left(\frac{v\pi}{2}\right) \\ r(u) + r'(u)N(k,v)\sin\left(\frac{v\pi}{2}\right) \\ Z(u) + Z'(u)N(k,v) \end{pmatrix}, \quad (2)$$

$$u, v \in [0; 1]; k \in [0, 05; 0, 45]$$

Where f'(u)=(r'(u), Z'(u)) is another linked 2D curve that determines where and how the contributions are applied.

Figure 11E:
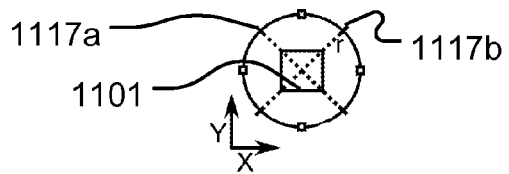
Figure 11D:
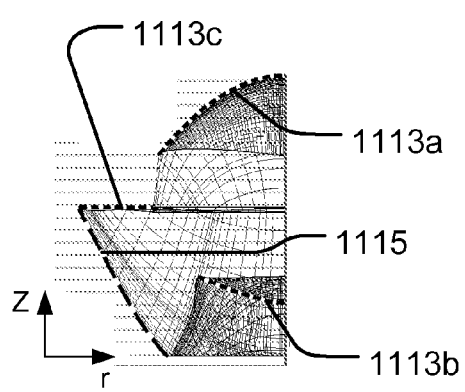

FIG. 11d illustrates how the Z-modification (in dotted lines) was applied to the entrance surface 1113a and exit surface 113b of the central lens and the exit surface 1113c of the peripheral lens, while r-modification (in dashed lines) was applied to the reflective surface 1115 of the peripheral lens. Each modified segment, as outlined in FIG. 11d was determined by a simple 3-vertex, 1D NURBS of 2nd degree, with the restriction that the two vertices that intersects the Z-axis be 0. This results in a total of 10 extra shape variables plus the k variable.

Figures 11F, 11G:
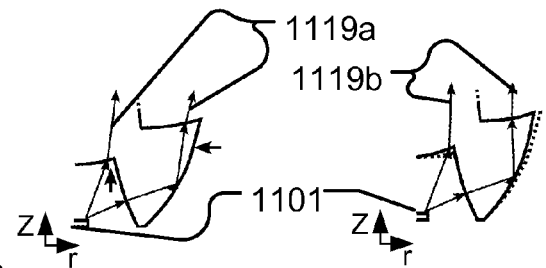

By applying N to a quarter-lens, the modification peak will be situated on the planes defined by the diagonals 1117a and 1117b of the LED die 1101 as illustrated in FIG. 11e. The effect of r- and Z-modification on the LED-light can be seen in FIGS. 11f and 11g which shows a cross-section of a TIR-lens along such a diagonal plane and where FIG. 11f illustrates the light beams 1119a before the modifications and FIG. 11g illustrates the light beams 1119b after the modifications where the modifications is indicated by dotted lines in FIG. 11g.

The NRS TIR-lens design was optimizing in order to achieve as round and circular spot as possible where the merit-function used to determine and optimize the roundness of the spot was defined as follows:

An array of values was calculated along a fan of measuring lines on the detector, with each value being the intensity-weighted Root-Mean-Square (RMS) distance along a line, determined by:

$$\text{rms}(\theta_i) = \sqrt{\frac{\sum_{k=1}^{n} I(r_k, \theta_i) r_k^2}{\sum_{k=1}^{n} I(r_k, \theta_i)}} \quad (3)$$

where I(r, θ) is the luminous intensity on the detector screen in a small area around the polar point r, θ from the center. Normalizing the RMS values by the mean RMS value, $\overline{\text{rms}}$, the RMS deviation from a circular spot is calculated as:

$$D = \sqrt{\frac{\sum_{i=1}^{n}\left(\frac{\text{rms}(\theta_i)}{\overline{\text{rms}}-1}\right)^2}{n}} \quad (4)$$

D is then the merit function to be minimized a mostly rectangular spot will have a larger deviation than a rounder profile. It is designed to yield fairly consistent results with varying numbers of measuring lines and choices of angular spread. It can also be used to adapt to a spot with any kind of RMS contour expressible in polar coordinates simply by exchanging '1' with a normalized polar reference-function.

The optimization was performed in the Ray-Tracing software created by the inventors, running in recursive mode, which splits the rays into a reflected and a refracted ray at each intersection. Luminus CBT-90 ray-source-files and schematics from "CBT-90 series LED. Luminus Devices, Inc." Website: http://www.luminus.com were used for maximum realism, with an equal mix of blue, red and green rays, and between 90,000 and 190,000 initial rays in each optimization step, the latter amount used for fine-tuning steps. The optimization algorithm was a Simulated-Annealing (SA) Monte Carlo, set to weigh luminous output and RMS-Contour at a ratio of (4:1) upon initialization and slowly converging to a final ratio of (3:2) as the SA 'temperature' and step-length decreased. This weighing scheme was selected after a string of trial runs having the goal of choosing the one most efficient at creating round spots with a high output. The RMS-Contour function (rms(θ$_i$)) of the gate-detector was assigned with 90 values of θ$_i$ in a full 360 degree span. The detector itself was a 25×25 mm2 rectangle divided into a grid of 51×51 pixels, each measuring luminous intensity.

The optimized NRS TIR-lens was compared with a symmetric lens TIR-lens and defocused TIR lens. The symmetric TIR lens was optimized for luminous output only and therefore having a sharply defined square spot. The defocused TIR-lens lens was optimized for color mixing when used in the illumination device of FIGS. 5a and 5b by defocusing its' spot.

Figure 11I:
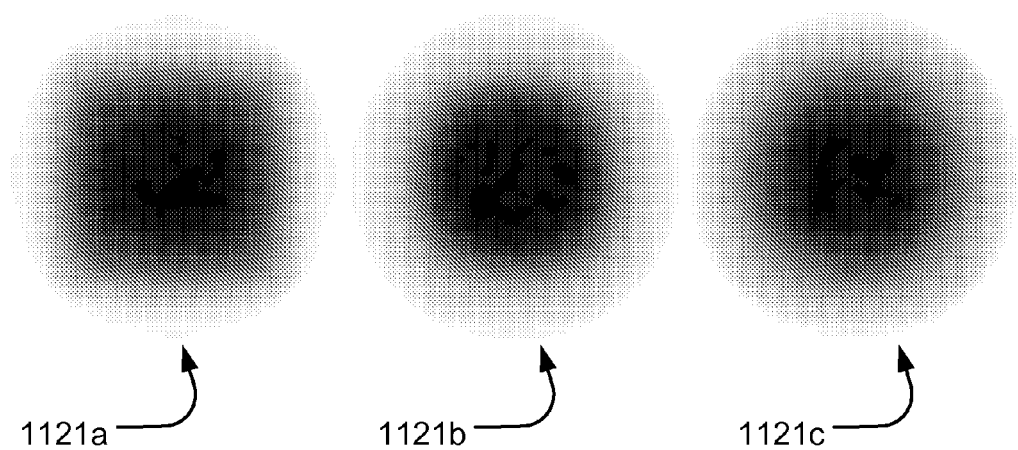
Figure 11J:
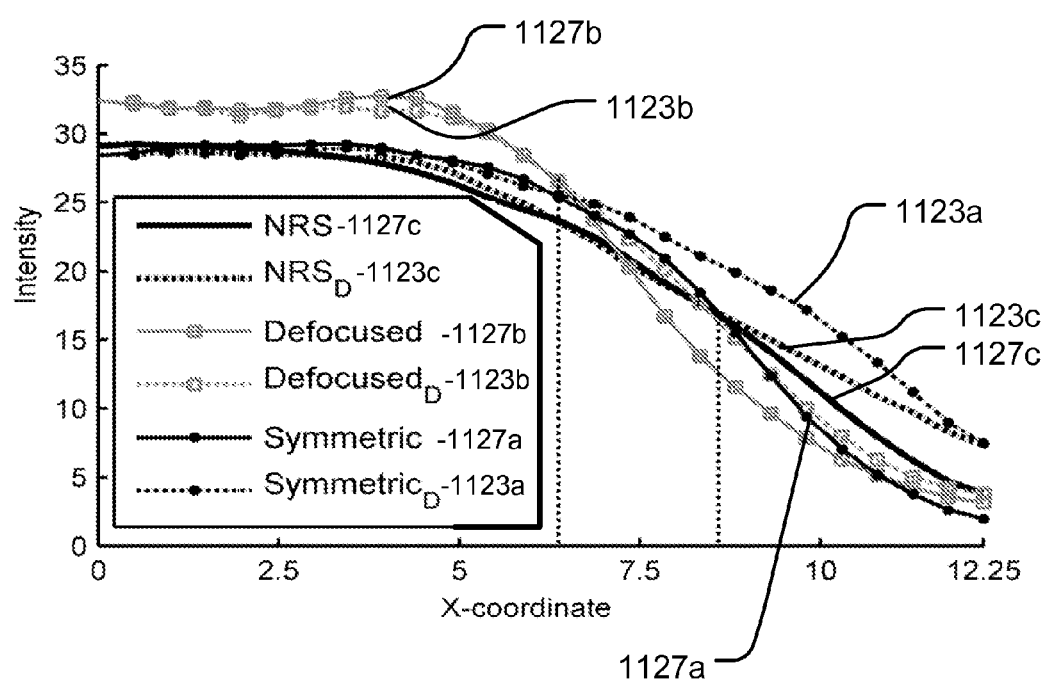

FIG. 11i illustrates intensity profiles 1121a, 1121b and 1121c of respectively the symmetric lens, the defocused lens and the optimized NRS-TIR-lens. In FIG. 11i darker shades represent higher intensity. The three different lenses are also compared in the table below showing the deviation from a round spot, contour-RMS, the normalized lumen and the peak intensity at the spot center.

|  | Symmetric TIR-lens | Defocused TIR lens | Optimized NRS TIR-lens |
| --- | --- | --- | --- |
| Contour-RMS | 0.45 | N/A | 0.15 |
| Lumen | 100 | 92.8 | 97.1 |

|  | Symmetric TIR-lens | Defocused TIR lens | Optimized NRS TIR-lens |
|---|---|---|---|
| Peak (lm/cm$^2$) | 32.5 | 34.9 | 32.6 |

The outputs from both the defocused and NRS-lens are clearly more circular than that of the symmetric. However, as can be seen the defocused lens have an ≈4.6% lower luminous output than the NRS-lens, as well as a higher maximum intensity (34.9 cm$^2$ vs 32.6 cm$^2$), indicating a steeper and more narrow spot. This can be verified in FIG. 11j, which illustrates the intensity of light along lines from the center e detector screen for each lens type. Curves 1123a, 1123b and 1123c illustrate respectively the intensity along the diagonal of the spots 1121a, 1121b and 1121c in FIG. 11i and illustrates thus the intensity from respectively Symmetric TIR-lens, Defocused TIR lens and optimized NRS TIR lens. Curves 1125a, 1125b and 1125c illustrate respectively the intensity along the central horizontal axis of the spots 1121a, 1121b and 1121c in FIG. 11i and illustrate thus the intensity from respectively Symmetric TIR-lens, Defocused TIR lens and optimized NRS TIR lens.

The NRS-lens start to diverge about 2.5 mm further out than the other lenses. The Contour-RMS of the optimized NRS-lens went down to ≈0.15 from ≈0.45 for the symmetric lens. The Contour-RMS of the defocused lens was not calculated, as this was optimized in ZEMAX which did not have this feature on the detector, but visually it appears not as round as the one from the NRS-lens.

Figure 12A:
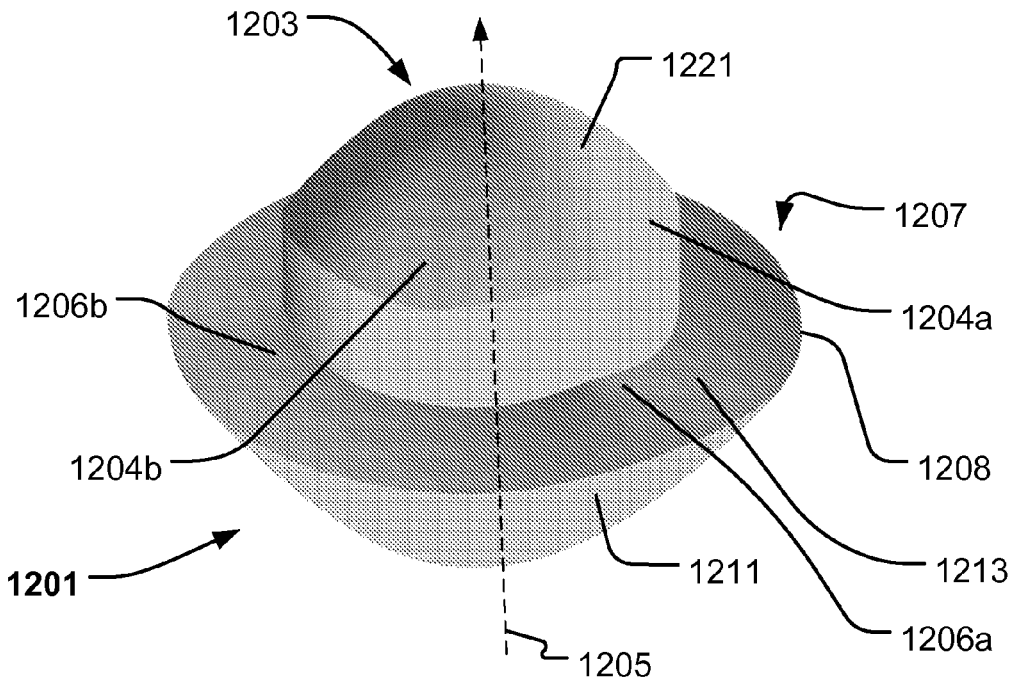
FIG. 12a-12b illustrate another light collector according to the present invention.
Figure 12B:
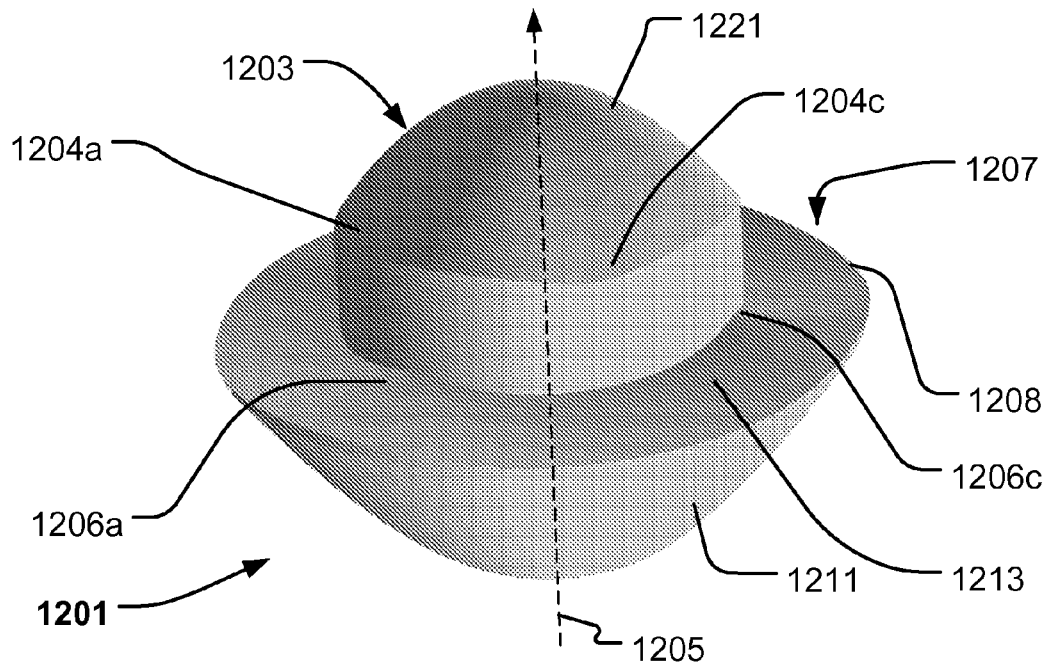

FIG. 12a and FIG. 112b illustrate perspective views of the NRS TIR lens 1201 optimized above where the modifications the peripheral lens and the central lens have been quadrupled in order to illustrate the modifications. In FIG. 12a the NRS-TIR lens 1201 have been rotated approximately 45 degrees around the optical axis 1205 compared to FIG. 12b. The NRS TIR lens 1201 comprises a central lens part 1203 aligned along an optical axis 1205 of the light source and a peripheral lens part 1207 surrounding at least a part of the central lens. The central exit surface 1221 of the central lens 1203 is rotationally asymmetric in relation to the optical axis which can be seen by small dips 1204a-1204c in the central exit surface 1221. In fact the central exit surface has four small dips 1204a-1204c which are separated by 45 degrees in relation to the optical axes. The small dips are positioned approximately above the sides of the LED and serve to distort the squared shape of the light source. The peripheral lens 1107 is also rotationally asymmetric in relation to the optical axis 1105 which can be seen by small tops 1106a-1106c in the peripheral exit surface 1113. In fact the peripheral exit surface has four small tops 1106a-1106c which are separated by 45 degrees in relation to the optical axes 1105 and are approximately positioned above and outside the corners of the LED. The reflective surface 1111 is also is also rotationally asymmetric in relation to the optical axes which best can be seen by the fact that the edged 1108 between the peripheral exit surface and the reflective surface is non circular. The small tops 1106a-1106c and the rotational asymmetric reflective surface 1111 corporate and serve to direct the peripheral light to areas where the central light is low. The small dips 1104a-1104c and the small tops 1106a-1106 are displaced 45 degrees around the optical axis and in relation to each other. In this way the central lens and the peripheral lens complement each other and the first cross sectional light distribution created by the central lens and the second cross sectional light distribution created by the peripheral leans are partially inverted in relation to each other.

The present invention can for instance be implemented into a projecting device comprising a digital imaging device such as a DML, DLP, LCD, LCOS or into the head of a moving head light fixture comprising a base, a rotatable yoke connected to the base and a rotatable head connected to the yoke. Hereby a power efficient digital projecting device or a moving head with uniform illumination of the imaging gate and without color artifacts is provided.

The invention claimed is:

1. A light collector for collecting light emitted by a light source and converting said collected light into a light beam, said light collector comprising:
   a central lens part aligned along an optical axis of said light source, said central lens comprising a central entrance surface and a central exit surface, a central part of said light emitted by said light source entering said central lens through said central entrance surface and leaving said central lens through said central exit surface, whereby said central part of said emitted light is converted into a first light beam part having a first cross sectional light distribution;
   a peripheral lens part surrounding at least a part of said central lens, said peripheral lens comprising a peripheral entrance surface, a peripheral reflection surface, and a peripheral exit surface, a peripheral part of said light emitted by said light source entering said peripheral lens through said peripheral entrance surface and reflected by said peripheral reflection surface before leaving said peripheral lens through said peripheral exit surface, whereby said peripheral part of said emitted light is converted to a second light beam part having a second cross sectional light distribution;
   wherein said central lens and said peripheral lens are mutually adapted to convert said light emitted by said light source into a common light beam having a substantial circular and rotationally symmetric cross sectional light distribution, wherein said common light beam comprises said first light beam part and said second light beam part, and
   wherein said central lens and said peripheral lens are adapted to complement each other, whereby said first cross sectional light distribution and said second cross sectional light distribution are partially inverted in relation to each other.

2. The light collector according to claim 1, wherein said central lens is rotationally asymmetric in relation to said optical axis and is adapted to distort said first cross sectional light distribution.

3. The light collector according to claim 1, wherein said peripheral lens is rotationally asymmetric in relation to said optical axis and is adapted to distort said second cross sectional light distribution.

4. The light collector according to claim 1, wherein at least one of:
   said peripheral entrance surface;
   said peripheral reflection surface;
   said peripheral exit surface;
   said central entrance surface; and
   said central exit surface;
   is rotationally asymmetric in relation to said optical axis.

5. The light collector according to claim 1, wherein said central lens comprises an extension part positioned between said central entry surface and said central exit surface, said extension part protruding from said peripheral exit surface and elevating said central exit surface a distance above said peripheral exit surface.

6. An illumination device comprising:
a light source module comprising a number light sources and a number of light collectors, said light collectors collecting and converting said light from at least one of said light sources into a source light beam, said source light beam propagating at least partially along a primary optical axis; and
an aperture positioned along said primary optical axis;
wherein at least one light source is rotationally asymmetric in relation to a source optical axis of the at least one light source and wherein a corresponding one of the light collectors comprises:
a central lens part aligned along said source optical axis, said central lens comprising a central entrance surface and a central exit surface, a central part of said light emitted by said light source entering said central lens through said central entrance surface and leaving said central lens through said central exit surface, whereby said central part of said emitted light is converted into a first light beam part having a first cross sectional light distribution; and
a peripheral lens part surrounding at least a part of said central lens, said peripheral lens comprising a peripheral entrance surface, a peripheral reflection surface, and a peripheral exit surface, a peripheral part of said light emitted by said light source entering said peripheral lens through said peripheral entrance surface and reflected by said peripheral reflection surface before leaving said peripheral lens through said peripheral exit surface, whereby said peripheral part of said emitted light is converted into a second light beam part having a second cross sectional light distribution,
wherein said central lens and said peripheral lens are mutually adapted to convert said light emitted by said light source into a common light beam having a substantial circular and rotationally symmetric cross sectional light distribution, wherein said common light beam comprises said first light beam part and said second light beam part.

7. The illumination device according to claim 6, wherein said first cross sectional light distribution and said second cross sectional light distribution are partially inverted in relation to each other.

8. The illumination device according to claim 6, wherein said central lens is rotationally asymmetric in relation to said source optical axis and is adapted to spherically distort said first cross sectional light distribution.

9. The illumination device according to claim 6, wherein said peripheral lens is rotationally asymmetric in relation to said source optical axis and is adapted to spherically distort said second cross sectional light distribution.

10. The illumination device according to claim 6, wherein at least one of:
said peripheral entrance surface;
said peripheral reflection surface;
said peripheral exit surface;
said central entrance surface; and
said central exit surface;
is rotationally asymmetric in relation to said source optical axis.

11. The illumination device according to claim 6, wherein said central lens comprises an extension part positioned between said central entry surface and said central exit surface, said extension part protruding from said peripheral exit surface and elevating said central exit surface a distance above said peripheral exit surface.

12. A method of designing a light collector for collecting light emitted by a rotationally asymmetric light source and converting said light into a light beam having a substantially circular cross sectional light distribution at an aperture, said method comprising steps of:
providing a light collector, said light collector comprising:
a central lens part aligned along an optical axis of said light source and adapted to convert a central part of said emitted light into a first light beam part having a first cross sectional light distribution, said central lens part comprising a central entrance surface and a central exit surface; and
a peripheral lens part surrounding at least a part of said central lens and adapted to convert a central part of said emitted light into a second light beam part having a second cross sectional light distribution, said peripheral lens part comprising a peripheral reflection surface and a peripheral exit surface;
maximizing light output of said light beam at said aperture by rotationally symmetrically adjusting a curvature of at least one of:
said peripheral entrance surface;
said peripheral reflection surface;
said peripheral exit surface;
said central entrance surface; and
said central exit surface; and
optimizing roundness of said cross sectional light distribution of said light beam at said aperture by rotationally asymmetrically adjusting the curvature of at least one of:
said peripheral entrance surface;
said peripheral reflection surface;
said peripheral exit surface;
said central entrance surface; and
said central exit surface.

13. The method according to claim 12, wherein said step of optimizing the roundness of said cross sectional light distribution of said light beam comprises a step of obtaining the roundness of said cross sectional light distribution of said light beam, and wherein said rotationally asymmetrically adjusting of the curvature of at least one of said surfaces is based on said obtained roundness.

14. The method according to claim 12, wherein said step of optimizing the roundness of said cross sectional light distribution is repeated a number of times.

15. A light collector for collecting light emitted by a light source and converting said collected light into a light beam, said light collector comprising:
a central lens part aligned along an optical axis of said light source, said central lens comprising a central entrance surface and a central exit surface, a central part of said light emitted by said light source entering said central lens through said central entrance surface and leaving said central lens through said central exit surface, whereby said central part of said emitted light is converted into a first light beam part having a first cross sectional light distribution;
a peripheral lens part surrounding at least a part of said central lens, said peripheral lens comprising a peripheral entrance surface, a peripheral reflection surface, and a peripheral exit surface, a peripheral part of said light emitted by said light source entering said peripheral lens through said peripheral entrance surface and reflected by said peripheral reflection surface before leaving said peripheral lens through said peripheral exit surface, whereby said peripheral part of said emitted light is converted to a second light beam part having a second cross sectional light distribution;

wherein said central lens and said peripheral lens are mutually adapted to convert said light emitted by said light source into a common light beam having a substantial circular and rotationally symmetric cross sectional light distribution, wherein said common light beam comprises said first light beam part and said second light beam part, and wherein said peripheral lens is rotationally asymmetric in relation to said optical axis and is adapted to distort said second cross sectional light distribution.

16. A light collector for collecting light emitted by a light source and converting said collected light into a light beam, said light collector comprises:

a central lens part aligned along an optical axis of said light source, said central lens comprising a central entrance surface and a central exit surface, a central part of said light emitted by said light source entering said central lens through said central entrance surface and leaving said central lens through said central exit surface, whereby said central part of said emitted light is converted into a first light beam part having a first cross sectional light distribution;

a peripheral lens part surrounding at least a part of said central lens, said peripheral lens comprising a peripheral entrance surface, a peripheral reflection surface, and a peripheral exit surface, a peripheral part of said light emitted by said light source entering said peripheral lens through said peripheral entrance surface and reflected by said peripheral reflection surface before leaving said peripheral lens through said peripheral exit surface, whereby said peripheral part of said emitted light is converted to a second light beam part having a second cross sectional light distribution;

wherein said central lens and said peripheral lens are mutually adapted to convert said light emitted by said light source into a common light beam having a substantial circular and rotationally symmetric cross sectional light distribution, wherein said common light beam comprises said first light beam part and said second light beam part, and wherein said central lens comprises an extension part positioned between said central entry surface and said central exit surface, said extension part protruding from said peripheral exit surface and elevating said central exit surface a distance above said peripheral exit surface.

* * * * *